April 22, 1969 L. P. JASORKA ET AL 3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Filed March 29, 1965 Sheet 1 of 20

INVENTORS
L. P. JASORKA
E. E. RICHARDS III

BY J. B. Hoofnagle, Jr.

ATTORNEY

April 22, 1969 L. P. JASORKA ET AL 3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Filed March 29, 1965 Sheet 2 of 20

April 22, 1969 L. P. JASORKA ET AL 3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Filed March 29, 1965 Sheet 4 of 20

April 22, 1969 L. P. JASORKA ET AL 3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Filed March 29, 1965 Sheet 6 of 20

April 22, 1969 L. P. JASORKA ET AL 3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Filed March 29, 1965

Sheet 16 of 20

United States Patent Office 3,440,531

Patented Apr. 22, 1969

3,440,531

SURFACE WIRING ASSIST DEVICE FOR SELECTING WIRE LENGTHS AND TERMINAL PAIRS TO BE INTERCONNECTED THEREBY WITH CONNECTION STATUS INDICATION

Larry P. Jasorka, Columbus, and Edward E. Richards III, New Albany, Ohio, assignors to Western Electric Company Incorporated, New York, N.Y., a corporation of New York Filed Mar. 29, 1965, Ser. No. 443,530

Int. Cl. G01r *19/00, 31/02;* B23q *17/00*

U.S. Cl. 324—66 10 Claims

ABSTRACT OF THE DISCLOSURE

A surface wiring assist device includes a frame which supports a row of lamps along one horizontal edge thereof and a pair of columns of lamps along opposite vertical edges thereof. An electrical device having terminals extending from one side thereof is positioned within the frame so that each terminal is associated with one of the lamps in the row of lamps and one of the lamps in an associated one of the columns of lamps. Selected lamps of the row and columns of lamps are illuminated to indicate the selection of an associated pair of terminals which are to be connected by a surface wire.

A wire supply includes a plurality of receptacles for supporting precut lengths of wire and includes a lamp adjacent to each receptacle for indicating the length of wire to be connected between the selected pair of terminals. When the wire is connected between the selected pair of terminals, an indicator is operated to indicate the proper connection.

This invention relates to a surface wiring assist device and particularly relates to a surface wiring indicator which supplies visual information for assisting in the selection of terminals which are to be wired.

In the manufacture of complex electronic equipment, it is frequently necessary to connect wires between terminals of a plurality of units to complete circuit paths. In order to facilitate the connection of the various terminals of such equipment, it is necessary to provide a wireman with wiring lists which numerically designate the numerous terminals of the equipment and, further, which instruct the wireman with numerical reference as to the selected terminals which are to be connected. Since the spacing between the respectively selected terminals is not consistent, a wire length list is required which provides additional information for the wireman revealing the given lengths of wires necessary for connecting the variously spaced selected terminals.

The compilation of information on the wiring list and the wire length list provides a complex accumulation of instructions which require considerable time in preparation and further necessitates time-consuming efforts by the wireman in extracting information necessary to complete the numerous wiring operations.

Even though the wireman is provided with the wiring lists and the wire length list, human error is a natural occurrence, particularly in instances where large numbers of terminals are to be connected. Hence, testing procedures are required to examine the completed assembly of connected wires between selected terminals. Such testing procedures necessitate further time-consuming effort on the part of a test operator as well as in the design of test equipment necessary for accomplishing the examination of the surface wiring. Furthermore, the correction of a detected wiring error may be difficult and time-consuming.

It is, therefore, an object of this invention to provide a new and improved indicating device for indicating the selection of at least one work element from a group of elements.

Another object of the invention is the provision of a new and improved assist device for instructing the wireman in the selection of at least a pair of terminals which are to be connected.

Still another object of the invention is the provision of a new and improved device for assisting a wireman in the selection of terminals to be connected and further for indicating to the wireman that a selected pair of terminals to be connected has been properly connected.

A further object of the invention is the provision of a new and improved device for assisting a wireman in the selection of terminals to be connected by a surface wire and for assisting the wireman in the selection of a proper length of wire to be connected between the selected terminals.

A still further object of the invention is the provision of a new and improved device for assisting a wireman in the successive selection of pairs of terminals to be surface wired by indicating the terminal pair selections succeeding the wiring of preceding selected terminal pairs.

With these and other objects in view, the present invention contemplates an assist device utilizing indicators for aiding a wireman in the selection of at least one work element from a group of elements. The indicators are arranged about the group of elements in such a manner that each element is associated with at least a pair of indicators. At least a pair of the indicators are selected to indicate the selection of the work element associated with the selectively operated indicators.

When used in a surface wiring procedure to notify a wireman which pair of a group of terminals are to be interconnected by a wire, the assist device separately and successively selects at least four indicators and thereafter operates the selected indicators in response to the completion of the selection thereof. The four selected indicators are paired and indicate the selection of the two terminals which are to be connected to opposite ends of the wire.

The assist device responds to the proper connection of the wire between the selected pair of terminals to indicate to the wireman that the proper wiring procedure has been accomplished. Further, in the event the proper wiring procedure is not accomplished, for example, the wire is connected between terminals other than the selected terminals, the assist device indicates to the wireman that an improper connection has been completed.

As a further means of assistance to the wireman during the wiring procedure, a wire supply having various lengths of precut wires is provided with indicators adjacent supply receptacles which receive common lengths of the precut wires. Upon the completion of the selection and operation of the indicators for indicating the selection of the pair of terminals, one of the wire supply indicators is selected and operated to indicate and assist the wireman in selecting the proper length of wire to be connected between the selected terminals.

Other objects and advantages of the present invention will be apparent from the following detailed description when considered in accordance with the accompanying drawings, wherein.

Figure 14:
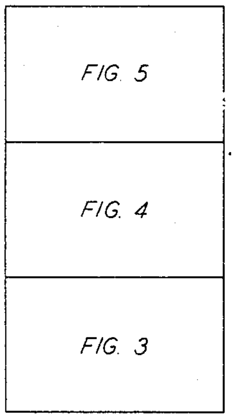
Figure 15:
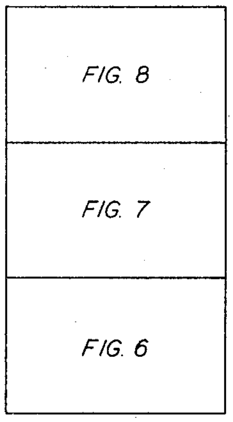

FIGS. 14 and 15 show the arrangement of FIGS. 3 through 5 and 6 through 8, respectively, for interconnecting electrical circuits therein; and FIGS. 16 through 23 are schematics showing electrical circuits for controlling the selective operation of a continuity detector of the surface wiring assist device.

PHYSICAL LAYOUT

Figure 1:
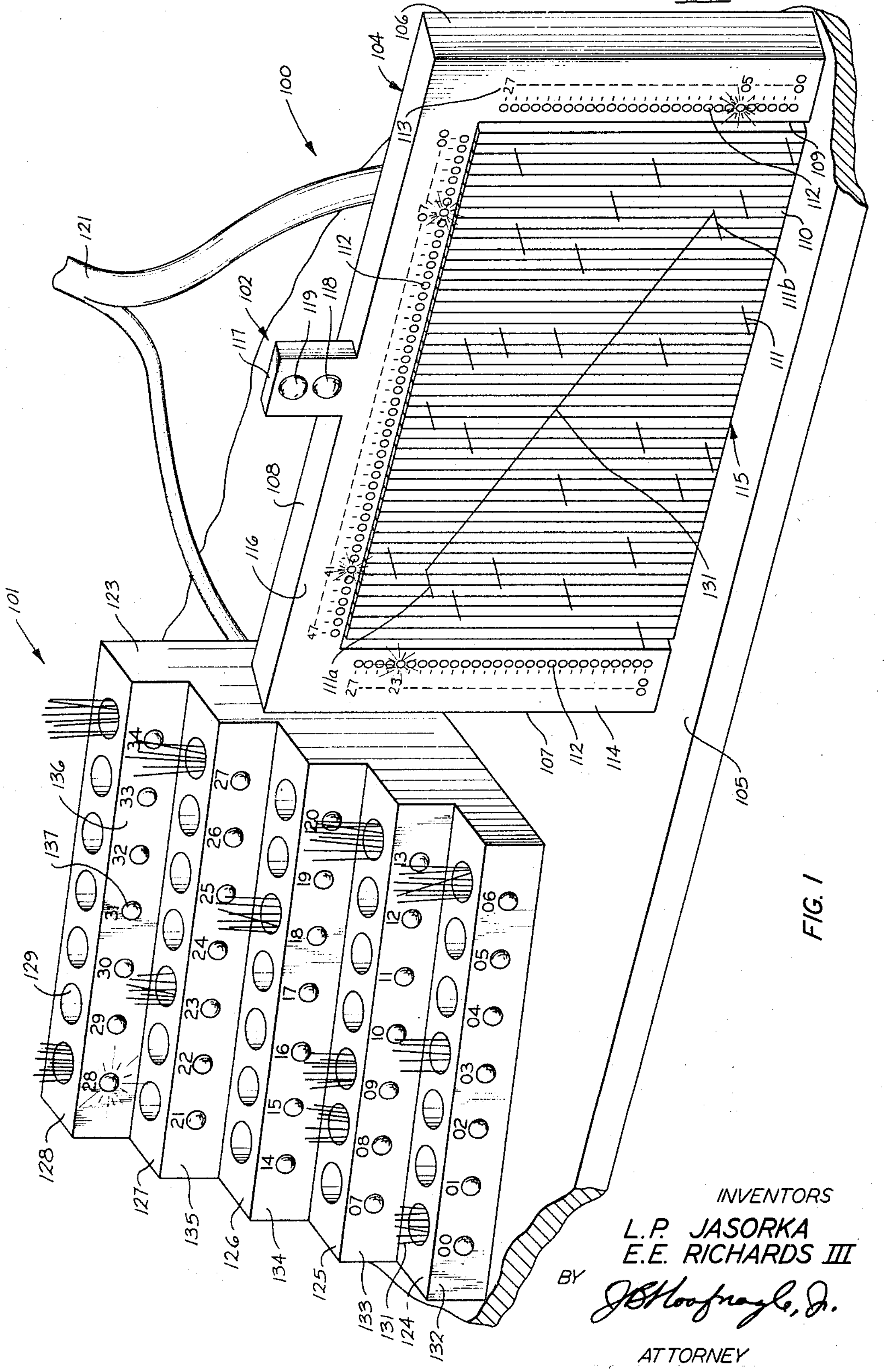
FIG. 1 is a perspective view showing a surface wiring assist device in accordance with the principles of the invention.

Referring to FIG. 1, generally the surface wiring assist device includes a wiring fixture, generally designated by the reference numeral 100, a wire selection supply, generally indicated by the reference numeral 101, and a continuity detector indicator, generally indicated by the reference numeral 102. The wiring fixture 100, the wire supply 101 and the detector indicator 102 are each provided with visual indicating units which assist a wireman in effecting a surface wiring procedure.

Figure 2:
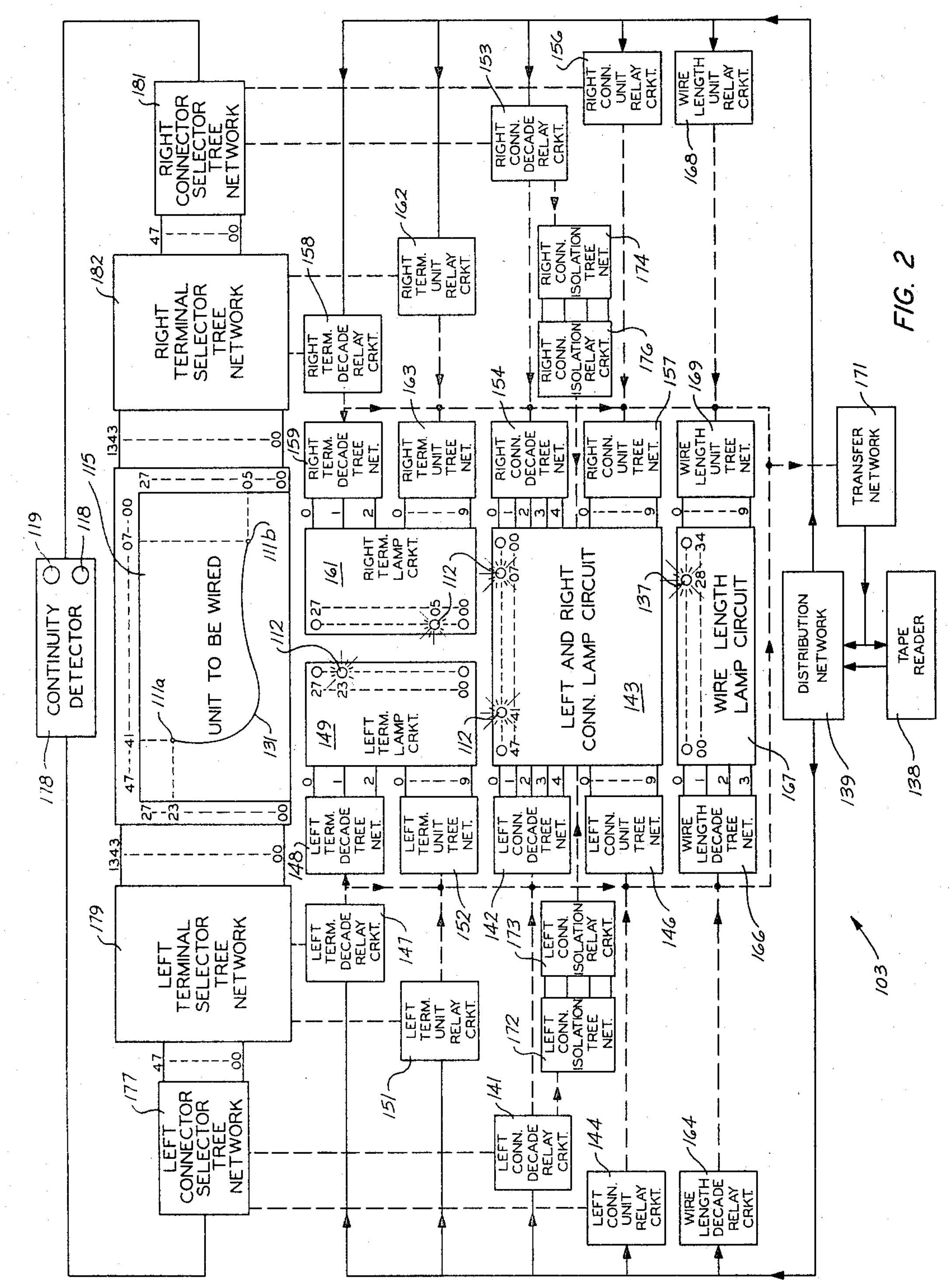
FIG. 2 is a block diagram of control circuits for selectively operating the surface wiring assist device.

Referring to FIG. 2, a control circuit, generally designated by the reference numeral 103 selects designated circuit paths for controlling the operation of the indicating units of the wiring fixture 100, the wire selection supply 101 and the continuity detector indicator 102.

Referring further to FIG. 1, the wiring fixture 100 of the surface wiring assist device includes an inverted U-shaped frame 104 having vertical side members 106 and 107 and an upper, horizontal bridging member 108 integrally connected with the vertical side members. The lower ends of the vertical members 106 and 107 of the frame 104 are positioned on the upper surface of a table 105. The frame 104 is provided with an opening 109 for receiving a plurality of connectors 110 which are preassembled and supported as a single unit 115. The assembled unit 115 includes forty-eight vertically aligned connectors 110 with each connector having twenty-eight terminals 111 extending therefrom in a vertically aligned column. In addition, the connector terminals 111 are also aligned in horizontally disposed rows. For the purposes of clarity, only a few of the terminals 111 are shown. However, it is to be noted that there are forty-eight columns of twenty-eight terminals 111 in each column to provide a total of 1344 terminals extending from the assembled unit 115.

As further shown in FIG. 1, each of the vertical side members 106 and 107 of the frame 104 is provided with the indicating units such as a vertical column of lamps 112 on front faces 113 and 114, respectively, wherein one of the lamps of each column is aligned with each horizontal row of the terminals 111 projecting from the assembled unit 115. In addition, the horizontal bridging member 108 of the frame 104 is provided with a horizontally disposed row of forty-eight lamps 112 on a front face 116 which are aligned respectively with each of the forty-eight vertical columns of terminals 111 projecting from the corresponding forty-eight connectors 110 of the assembled unit 115. The vertical columns of lamps 112 on the frame faces 113 and 114 are referred to as the right and left terminal lamps, respectively, while the horizontal row of lamps on the face 116 are referred to as the connector lamps.

The lamps 112 are utilized by a wireman in the selection of a pair of the terminals 111 which are to be connected by surface wiring. Each of the lamps 112 on the faces 113, 114 and 116 are assigned indicating numbers which are placed on the face adjacent the respective lamp. For example, the vertical columns of twenty-eight lamps 112 on the side member faces 113 and 114 are assigned numbers from the lowermost lamp starting with 00 and extending upwardly to the uppermost lamp to the number 27. The horizontal row of lamps 112 mounted on the bridging member face 116 of the frame 104 are assigned numbers starting on the extreme right with the number 00 and extending to the lamp on the extreme left which is numbered 47. It is noted, however, that the numerical designations adjacent the lamps 112 are not necessary for the objects of the invention but are merely displayed for the purposes of simplicity of description.

In the selection of a pair of terminals 111 to be connected by a surface wire, a left terminal is designated by the crosspoint of lines extending from a pair of the illuminated lamps 112 which includes one of the left terminal lamps on the face 114 and the leftmost illuminated lamp appearing in the horizontal row of connector lamps. In this instance, the left illuminated lamp 112 in the horizontal row of connector lamps is referred to as the left connector lamp. The selected right terminal 111 appears at the crosspoint of lines extending from a pair of illuminated lamps 112 which includes one of the right terminal lamps on the face 113 and the rightmost illuminated lamp appearing in the horizontal row of connector lamps. In this instance, the rightmost illuminated connector lamp 112 is referred to as the right connector lamp.

In the event the pair of selected terminals 111 appear in a single vertical column of terminals, that is in a single connector 110, only one connector lamp 112 will be illuminated. Hence, the single, selected connector lamp 112 serves as both the left and right connector lamps. In addition, the pair of selected terminals 111 may both appear near the extreme right or the extreme left of the assembly 115. Hence, the illuminated connector lamps 112 will also appear on the same corresponding side but will still be referred to as the left and right connector lamps to facilitate simplicity of description and designation.

Referring further to FIG. 1, a continuity detector indicator 102, which forms a portion of a continuity detector system, is supported on a panel 117 formed on the upper surface of the bridging member 107 and includes a green lamp 118 and a red lamp 119 for providing an indication to the wireman that the selected terminals have been properly connected.

One end of a cable 121 is connected to the rear portion of the frame 104 and is also connected to circuit connections of the assembled unit 115 which are accessible from the rear side of the assembled unit and which are connected with the respective terminals 111. The opposite end of the cable 121 is connected to the control circuit 103 for establishing circuit paths to illuminate selected lamps 112, thereby providing indication to the wireman in the selection of the terminals 111 which are to be connected. In addition, the cable 121 provides coupling between the control circuit 103 and the continuity detector lamps 118 and 119 which are utilized to indicate proper connection of the selected terminals.

As further shown on FIG. 1, the wire length selection supply 101 is positioned on the table 105 adjacent the frame 104 and includes a stepped rack 123 having horizontally disposed steps 124 through 128. Each of the steps 124 through 128 is formed with seven receptacles 129 which extend from the surface of the respective steps downwardly into the rack 123 and are provided for receiving precut, prestripped lengths of wires 131. It is noted that the wires 131, which are positioned in a given receptacle 129, are all of the same length.

Vertical surfaces 132 through 136 of the rack 123, which are contiguous with the horizontally disposed steps 124 through 128, respectively, each support seven spaced lamps 137 which appear beneath and are aligned with the seven receptacles 129 of each step. For the purposes of clarity, numbers have been assigned the lamps 137 starting with the numbers 00 for the lowermost lamp of the extreme left column of lamps and extending to the number 34 for the uppermost lamp of the extreme right column. Hence, illumination of a given lamp 137 is an indication of the wire length required for a selected connection and instructs the wireman to select one of the wires 131 from the designated receptacle 129 to facilitate the proper connection between selected terminals 111.

GENERAL OPERATION

Referring further to FIG. 1, the wireman starts the surface wiring procedure by initiating the application of tape-supplied information to the control circuit 103 for completing circuit paths to selected lamps 112 of the frame 104 and to one of the lamps 137 of the wire length indicator 101. In addition, the red lamp 119 of the continuity detector indicator 102 is normally illuminated during the entire period when the indicators 112 and 137 are being selected and further, during the wiring procedure until the selected wire 131 has been placed between the pair of selected terminals 111.

As the selected circuit paths are completed, assume that the left terminal lamp 112, designated number 23, mounted on the side member face 114, is illuminated and that the left connector lamp, designated number 41, mounted on the bridging member face 116, is illuminated. A crosspoint of a horizontal line extending from the left terminal lamp 112, designated number 23, and a vertical line extending from the left connector lamp, designated number 41, coincides with a terminal 111*a* which indicates to the wireman that this terminal is one of the selected terminals to be connected.

In addition, the right terminal lamp 112, designated number 05 on the side member face 113, is illuminated and the right connector lamp, designated number 07, mounted on the bridging member face 116 is illuminated. A crosspoint of a horizontal line extending from the right connector lamp 112, designated number 07, and a vertical line extending from the right terminal lamp, designated number 05, coincides with a second selected terminal 111*b*, thereby indicating to the wireman that a wire 131 is to be connected between the selected terminals 111*a* and 111*b*.

The wireman scans the wire selection supply 101 searching for one of the illuminated lamps 137 which, in this instance, is the lamp designated number 28. The wireman then selects one of the wires 131 within the receptacle 129 which is adjacent the illuminated lamp 137, designated number 28. By selecting the wire 131 from the receptacle 129 adjacent the illuminated lamp 137, designated number 28, the wireman knows that the proper length of wire has been selected for completing the connection between the selected, spaced terminals 111*a* and 111*b*. Thereafter, the wireman secures the opposite ends of the selected wire 131 to the respective terminals 111*a* and 111*b* by conventional means such as solder connections or by solderless wire wrap connections. Hence, utilization of the surface wiring assist device in the manner described eliminates the necessity of the time-consuming effort of preparing and reading cumbersome wiring lists and wire length lists and has further visually indicated to the wireman which pair of terminals 111 are to be connected to opposite ends of the selected wire 131.

During the period when the lamps 112 are illuminated to indicate the selected pair of terminals 111*a* and 111*b*, and also when the wireman is selecting the wire 131 as indicated by the illuminated lamp 137, the red lamp 119 of the continuity detector indicator 102 is illuminated to indicate that the wire has not been connected between the selected terminals. The wireman then connects one end of the selected wire 131 to the selected terminal 111*a* and thereafter connects the other end of the wire to the selected terminal 111*b*. As the wire 131 engages the terminal 111*b*, or as the wire wrap tool used by the wireman in a solderless wire wrap operation engages the terminal 111*b*, a circuit path is completed which results in the illumination of the green lamp 118 of the continuity detector indicator 102 and the continuity path of the red lamp 119 is opened to indicate to the operator that the selected wire 131 has been connected between the selected, spaced terminals 111*a* and 111*b*.

In the event the wireman erroneously connects the selected wire 131 between terminals 111 other than the pair of selected terminals 111*a* and 111*b*, the red lamp 119 remains illuminated, thereby indicating to the wireman that the wire has been connected between two terminals other than the pair of selected terminals. The wireman can then examine the illuminated lamps 112 to select the designated terminals 111*a* and 111*b* and thereafter complete the proper connection with the selected wire 131. At this time, the green lamp 118 will be illuminated to indicate that the proper connection has been completed.

Utilization of the continuity detector system with the continuity indicator 102 in cooperation with the surface wiring procedure eliminates the necessity of testing procedures on a completely wired unit 115 and further eliminates costly and time-consuming rewiring of misplaced or missing wiring. After completing the connecting of the selected wire 131 between the selected terminals 111*a* and 111*b*, the wireman initiates the operation of feeding the next bit of tape information to the control circuit 103 for selecting a different pattern of illuminated lamps 112 and 137 for selecting another pair of terminals 111 to be connected by a selected wire 131. In addition, a circuit path for the green lamp 118 in the continuity detector system is opened and the red lamp 119 is illuminated to condition the surface wiring assist device for the next wiring procedure.

Figure 3:
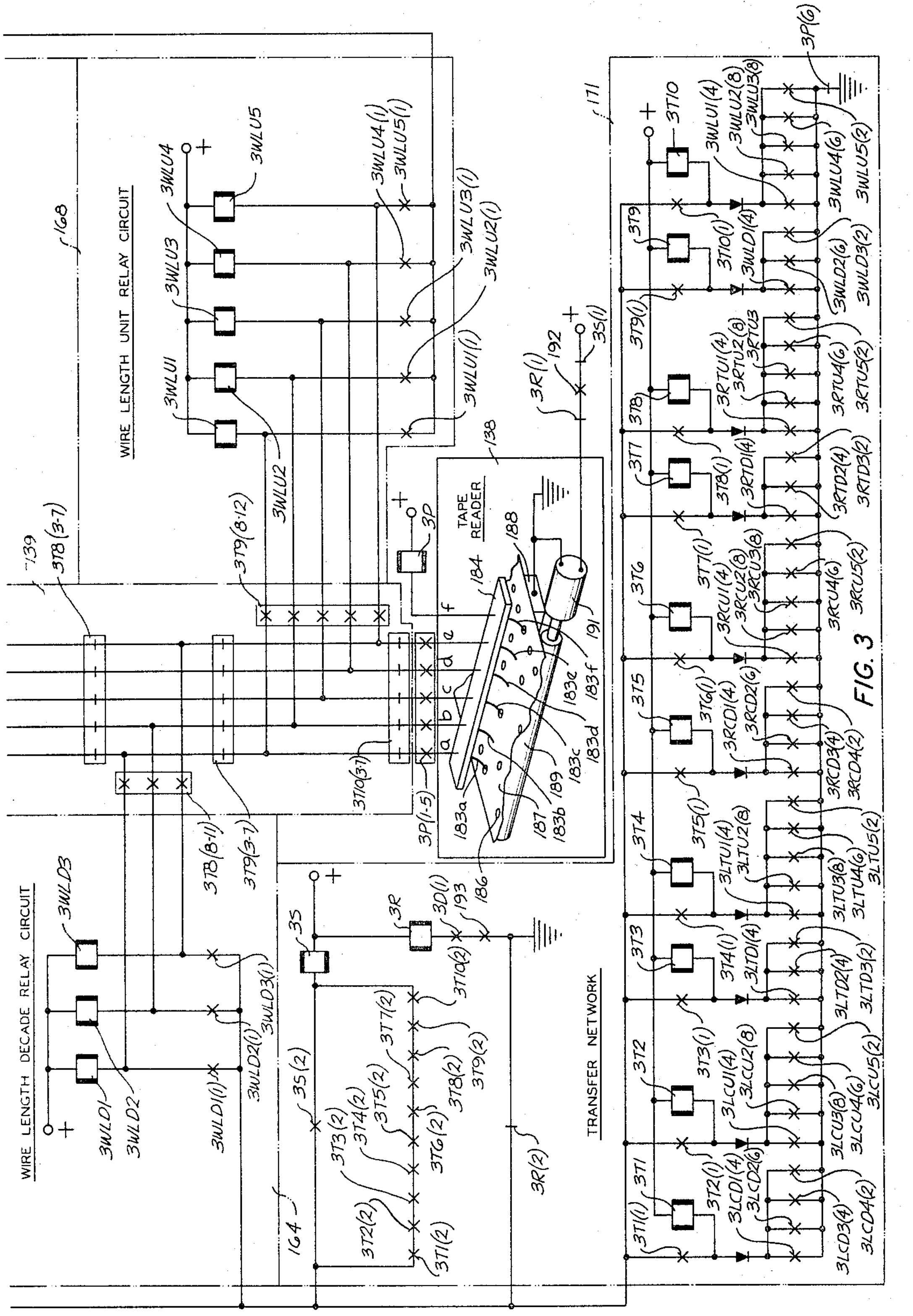
FIGS. 3 through 13 are schematics showing electrical circuits for the surface wiring assist device.

The surface wiring assist device is programmed and controlled by information on a punched tape 187 (FIG. 3). The punched tape 187 is provided with sufficient channels for providing a readout of ten legitimate characters for each wiring procedure. Selection of each of the lamps 112 and the lamp 137 for selecting the terminals 111 and the wire 131, respectively, requires information from the punched tape 187 in the form of two digits. Since there are four terminal indicating lamps 112 and one wire length indicating lamp 137 to be illuminated, ten legitimate characters are necessary for providing the ten digits representative of the complete set of instructions for a single wiring procedure.

For example, assuming that the left connector lamp 112, designated number 41, and the left terminal lamp, designated number 23, are selected to indicate selection of the terminal 111*a*, the digital information supplied by the punched tape 187 provides a readout in the form of the combination number 4123. Further, assuming that the right connector lamp 112, designated number 07, and the right terminal lamp, designated number 05, are selected to indicate the selection of terminal 111*b*, the information supplied by the punched tape 187 would provide a numerical designation such as 0705. In addition, assuming that the lamp 137, designated number 28, is selected to indicate the length of wire 131 to be connected between the selected terminals 111*a* and 111*b*, the information on the punched tape 187 will be supplied in a form representative of the number 28. Hence, the entire readout of the digital information from the punched tape 187 for the wiring procedure set forth in the examples above would include a ten digit representation such as 4123 0705 28.

GENERAL SELECTION OF TERMINALS AND WIRE LENGTH

Referring now to FIG. 2, the surface wiring assist control circuit 103 includes a tape reader 138 which extracts information from the punched tape 138 and thereafter feeds the extracted information, in the form of electrical instructions, through a distribution network 139 to various selector relay circuits for establishing circuit paths to the selected lamps 112 and 137 which are to be illuminated.

Initially, instructions are distributed from the distribution network 139 to a left connector decade relay circuit 141 which establishes a circuit path in a left connector decade tree network 142 for selecting the decade digit of the selected left connector lamp 112 in a left and right connector lamp circuit 143. Thereafter, a left connector unit relay circuit 144 responds to instructions from the punched tape for establishing a circuit path in a left connector unit tree network 146, whereby the unit digit is selected for the left connector lamp 112 in the lamp circuit 143.

Assuming that the left connector lamp 112, designated by the number 41 is to be selected, the circuit path in the tree network 142 would select the decade digit of 4 and the circuit path of the tree network 146 would select the unit digit of 1 to select the indicating connector lamp designated number 41. It is noted that the operating potential for the selected lamps 112 and 137 is withheld until all of the lamps have been selected for a single wiring procedure.

Subsequent to the selection of the left connector lamp 112, a left terminal decade relay circuit 147 responds to instructions from the punched tape 187 and establishes a circuit path in a left terminal decade tree network 148, whereby the decade digit is selected for the left terminal lamp 112 in a left terminal lamp circuit 149. Thereafter, a left terminal unit relay circuit 151 responds to instructions from the punched tape 187 and establishes a circuit path in a left terminal unit tree network 152, whereby the unit digit is selected for the left terminal lamp 112 in the lamp circuit 149. Assuming that the left terminal lamp 112, designated number 23, is to be selected, the circuit path established in the tree network 148 selects the decade digit 2 and the circuit path established in the tree network 152 selects the unit digit 3, thereby numerically indicating the selected left terminal lamp designated number 23.

A right connector decade relay circuit 153 responds to the instructions from the punched tape 187 and establishes a circuit path in a right connector decade tree network 154 for selecting the decade digit associated with the selected right connector lamp 112 in the lamp circuit 143. Subsequently, a right connector unit relay circuit 156 establishes a circuit path in a right connector unit tree network 157 which selects the unit digit of the selected right connector lamp 112 in the lamp circuit 143. Assuming the lamp 112, designated by the number 07 is to be illuminated, the circuit path in the tree network 154 selects the decide digit 0 and the circuit path of the tree network 157 selects the unit digit 7, thereby completing the selection of the designated number 07.

Thereafter, a right terminal decade relay circuit 158 responds to information from the punched tape 187 and establishes a circuit path in a right terminal decade tree network 159 for selecting the decade digit associated with the selected right terminal lamp 112 in a right terminal lamp circuit 161. A right terminal unit relay circuit 162 thereafter responds to instructional information from the punched tape 187 and establishes a circuit path in a right terminal unit relay network 163 for selecting the unit digit of the selected right terminal lamp 112 in the lamp circuit 161. Assuming that the right terminal lamp 112 to be selected is designated by the number 05, the circuit path established in the tree network 159 selects the decade digit 0 and the circuit path established in the tree network 163 selects the unit digit 5, whereby the selection of the designated number 05 is completed.

Subsequent to the selection of the left and right connector lamps 112 and the left and right terminal lamps 112, a wire length decade relay circuit 164 responds to information from the punched tape 187 and establishes a circuit path in a wire length decade tree network 166 for selecting the decade digit of the selected wire length lamp 137 in a wire length lamp circuit 167. Thereafter, a wire length unit relay circuit 168 responds to instructional information from the punched tape 187 and establishes a circuit path in a tree network 169 for selecting the unit digit associated with the selected wire length lamp 137 of the lamp circuit 167. Assuming that the wire length lamp 137 to be selected is designated by the number 28, the circuit path established in the tree network 166 selects the decade digit 2 and the circuit path established in the tree network 169 selects the unit digit 8, whereby the designated lamp number 28 is selected.

As shown generally in FIG. 2, each of the relay control circuits of the left and right connector, left and right terminal and wire length relay circuits sequentially control a transfer network 171 which establishes circuit paths in the distribution network 139 for directing the taped instructions to the proper relay circuit. In addition, the transfer network 171 responds to the completion of the selection of the terminal and connector lamps 112 and the wire length lamp 137 by stopping the tape reader 138. As the tape reader 138 is stopped subsequent to the selection of the indicating lamps 112 and 137, the illuminating potential is applied to the lamps, whereby the lamps are illuminated to instruct the wireman in the selection of the terminals 111 and the wire 131. Upon completion of the wiring procedure, the wireman again operates the tape reader 138 for initiating another wiring cycle.

During each wiring procedure, the left connector decade relay circuit 141 also establishes a circuit path in a left connector isolation tree network 172 for controlling the operation of left connector isolation relay circuit 173. Operation of the relay circuit 173 controls associated relay contacts in the left and right connector lamp circuit 143 for isolating the selected left connector lamp 112 from the right connector lamps. In addition, the right connector decade relay circuit 153 also establishes a circuit path in a right connector isolation tree network 174 for controlling the operation of a right connector isolation relay circuit 176. Operation of the isolation relay circuit 176 controls associated relay contacts in the connector lamp circuit 143 for isolating the selected right connector lamp 112 from the left connector lamps. These circuits preclude the possibility of crossover in the selection of the connector lamps 112 which could result in erroneous selection indications.

Referring further to FIG. 2, the assembled unit 115 is assembled in the wiring fixture 100 which, for the purposes of description, is shown with left and right vertical columns of terminal designation number 00–27 and a horizontal row of connector designation numbers 00–47. Following the previously selected examples, it is noted that the selected left terminal 111*a* has a left connector designation of 41 and a left terminal designation of 23. Further, the selected right terminal 111*b* has a right connector designation of 07 and a right terminal designation of 05.

GENERAL OPERATION OF CONTINUITY DETECTOR

In the continuity detector system, a left connector selector tree network 177 is provided with a single tree input line connected to a continuity detector 178 which controls illumination of the green lamp 118 and the red lamp 119. The tree network 177 is provided with a possible 48 selective circuit paths representative of the 48 connectors of the assembled unit 115 and are indicated by 48 output lines numbered 00–47.

The 48 output lines 00–47 of the tree network 177 are coupled to 48 corresponding input lines 00–47 of a left terminal selector tree network 179 which has selective circuit paths for 1344 output lines, numbered 00–1343, representative of, and respectively connected to, the 1344 terminals 111 of the assembled unit 115.

A right connector selector tree network 181 is provided with a single input line which is also connected to the continuity detector 178 in such a manner that the detector is connected between the single input lines of the tree networks 177 and 181. The tree network 181 is also provided with a possible 48 selective circuit paths having forty-eight output lines designated by the numbers 00–47 and representative of the 48 connectors of the assembled unit 115. The 48 output lines 00–47 of the tree network 181 are coupled to 48 corresponding input lines 00–47 of a right terminal selector tree network 182, which provides selective circuit paths for 1344 output lines 00–

1343 representative of, and respectively connected to, the 1344 respective terminals 111 of the assembled unit 115. The output lines of the tree network 182 are numbered 00–1343.

Upon operation of the left connector decade and left connector unit relay circuits 141 and 144, respectively, a circuit path is established in the tree network 177 which connects the left side of the continuity detector 178, as viewed in FIG. 2, to the input side of the tree network 179. In addition, operation of the left terminal decade and left terminal unit relay circuits 147 and 151 establishes a circuit path in the tree network 179 which connects the left side of the continuity detector 178 to the selected terminal 111*a*.

Further, operation of the right connector decade and right connector unit relay circuits 153 and 156, respectively, establishes a circuit path in the tree network 181 by connecting the right side of the continuity detector 178, as viewed in FIG. 2, to the input side of the tree network 182. Upon operation of the right terminal decade and right terminal unit relay circuits 158 and 162, respectively, a circuit path is established in the tree network 182 for connecting the right side of the continuity detector 178 to the selected terminal 111*b*. It is noted that the establishment of circuit paths in the tree neworks 177, 179, 181 and 182 is simultaneous with establishment of circuit paths in the tree networks for selecting the various indicator lamps 112.

During the period when the lamps 112 and 137 are being selected and illuminated, the red lamp 119 is illuminated to indicate that the wire 131 has not been connected between the selected terminals 111*a* and 111*b*. Subsequent to the selection of the wire 131 from the indicated receptacle 129 of the wire selection supply 101, the wireman connects one end of the selected wire to one of the selected terminals, for example the terminal 111*a*, and thereafter the wireman connects the opposite end of the selected wire 131 to the remaining selected terminal 111*b*. As the wire end engages the selected teminal 111*b*, a circuit path is completed which includes the tree networks 177 and 179, the selected terminal 111*a*, the selected wire 131, the terminal 111*b*, the tree networks 182 and 181 and the continuity detector 178. As the circuit path is completed by assembly of the selected terminals 111*a* and 111*b*, the continuity detector 178 responds to the proper connection by removing the illuminating potential from the red lamp 119 and applying potential to the green lamp 118, whereby the green lamp is illuminated. Thus, the illumination of the green lamp 118 indicates to the wireman that the proper selected connection has been completed.

At this time, as previously discussed, the wireman starts the operation of the tape reader 138 for another instruction cycle wherein the various relay circuits establish circuit paths in the tree networks for selecting the indicator lamps 112 and 137 and for further establishing circuit paths in the continuity detection system.

DETAILED OPERATION

It is to be noted that FIGS. 3–13 and 16–23 employ a type of notation referred to as "detached contacts" in which a line perpendicular to a circuit lead represents normally closed contacts and X represents normally open contacts, "normally" referring to the unoperated condition of a relay or other contact-controlling device.

It is also to be noted that the reference designations of the components of the present invention indicate in each instance the number of the figure on which the component is located, the function of the component, and in the case of some components, the component number. For example, a selector relay may be referred to in the specification as 3LCD1 where the 3 represents the figure on which the relay or other contact-controlling device is located, the LCD represents the function, such as left connector decade relay and the 1 represents one of a group of such devices which cooperate with other devices to accomplish a common function such as the selection of the left connector decade digit. Also, the contacts of a particular selector relay use the same functional designation as the relay or device which operates such contacts. Since many different sets of contacts may be controlled by one selector relay or device, the sets of contacts are also represented by another number which designates a particular set of contacts. For example, a set of contacts may be referred to as 4LCD1(2), where the 4 indicates the figure on which such contacts are located, the LCD is the functional designation of the particular selector relay or other contact-controlling device which operates such contacts, the 1 represents the particular relay of the LCD functional group, and the (2) indicates a particular set of the contacts. A plurality of commonly controlled sets of contacts are referred to as 6LCI4(1–10), where the (1–10) indicates ten sets of contacts numbered 1 through 10.

Moreover, the various circuit diagrams of FIGS. 3–13 and 16–23 are related to the block diagram of FIG. 2 which is shown by outlining such circuit diagrams with phantom lines and indicating by appropriate titles and numbers the particular block of the block diagram of FIG. 2 in which such circuit diagram is located. Unless otherwise noted in the figures, the system uses a 48 volts D.C. power supply. The exceptions to this use are in the various lamp circuits and a transistor circuit which use a 4.5 volts D.C. power supply as noted in the figures. However, it is to be noted that operation of the device is not limited to the power supplies stated but may operate at other potentials without departing from the spirit and scope of the invention.

As shown in FIG. 3, the tape reader 138 includes a plurality of sensing fingers 183*a*–183*f* which extend from a finger support 184. The free ends of the fingers 183 sense patterned apertures 186 in the punched tape 187. The sensing fingers 183*a*–183*f* are attached to terminals mounted on the finger support 184 where the terminals are further connected to outputs *a–f*, respectively, of the tape reader 138. A ground bar 188 connected to ground is positioned beneath the portion of the tape 187 which passes under the sensing fingers 183*a*–183*f* where given fingers engage the bar upon the positioning of one of the apertures 186 beneath the given fingers. A tape feed-roller 189 is mechanically coupled to a drive motor 191 which facilitates the operation of the tape reader 138 by passing the tape 187 between the sensing fingers 183*a*–183*f* and the ground bar 188.

Referring further to FIG. 3, the wireman initiates the wiring procedure by closing a start switch 192, whereby operating potential is applied to the tape reader motor 191 to initiate the first tape reading cycle of ten legitimate characters. A normally closed contact 3S(1), which is associated with a stop relay 3S located in the transfer network 171, is connected in the tape reader motor circuit for controlling the stopping of the tape reader 138 upon the completion of the reading of ten legitimate characters. In addition, a normally closed contact 3R(1), which is associated with a reset relay 3R, is also located in the transfer circuit 171 and is connected in series with the start switch 192 for precluding possible operation of the tape reader 138 during a period when the surface wiring assist device is being reset for a subsequent lamp selection procedure.

Figure 4:
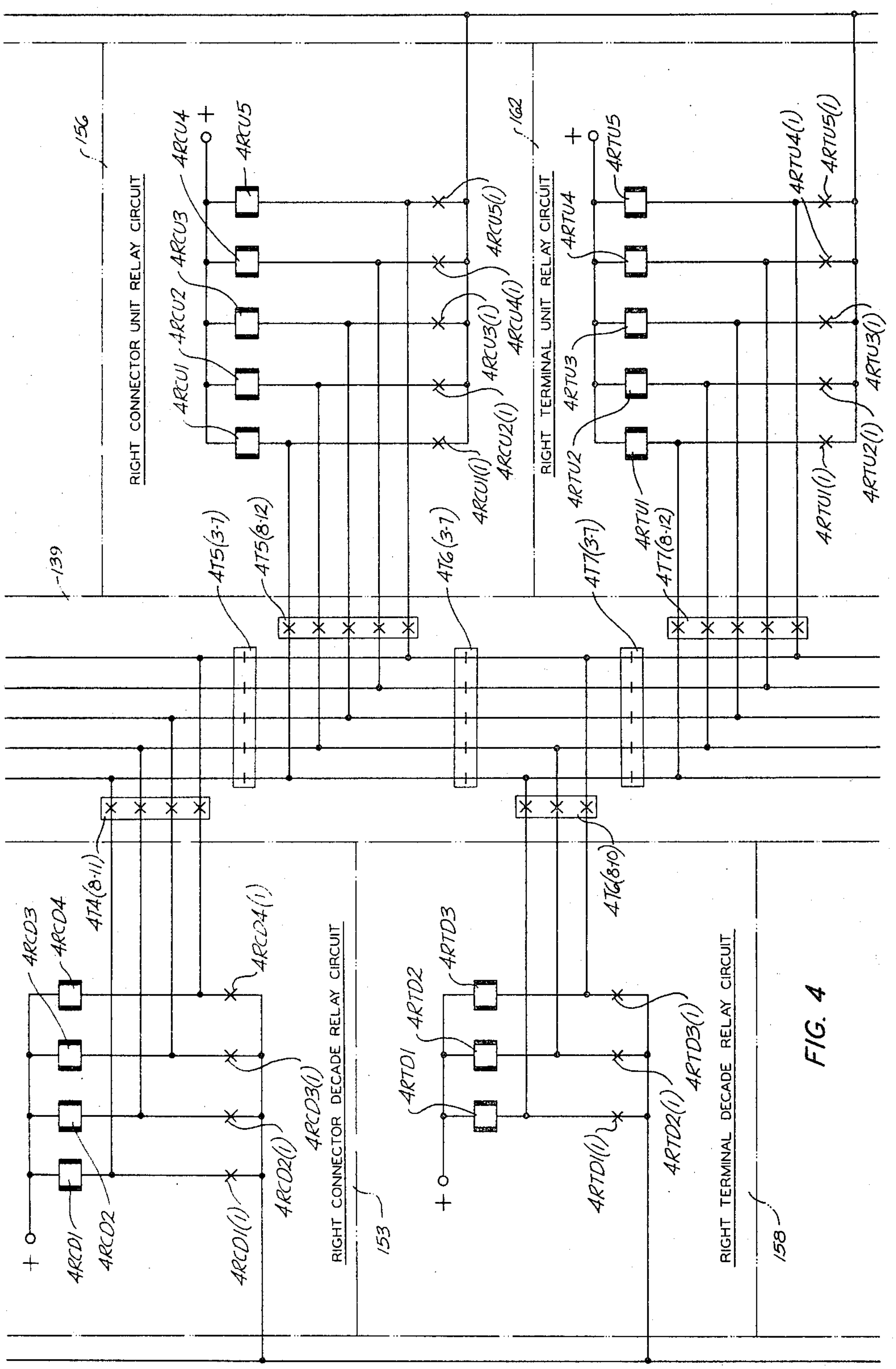
Figure 5:
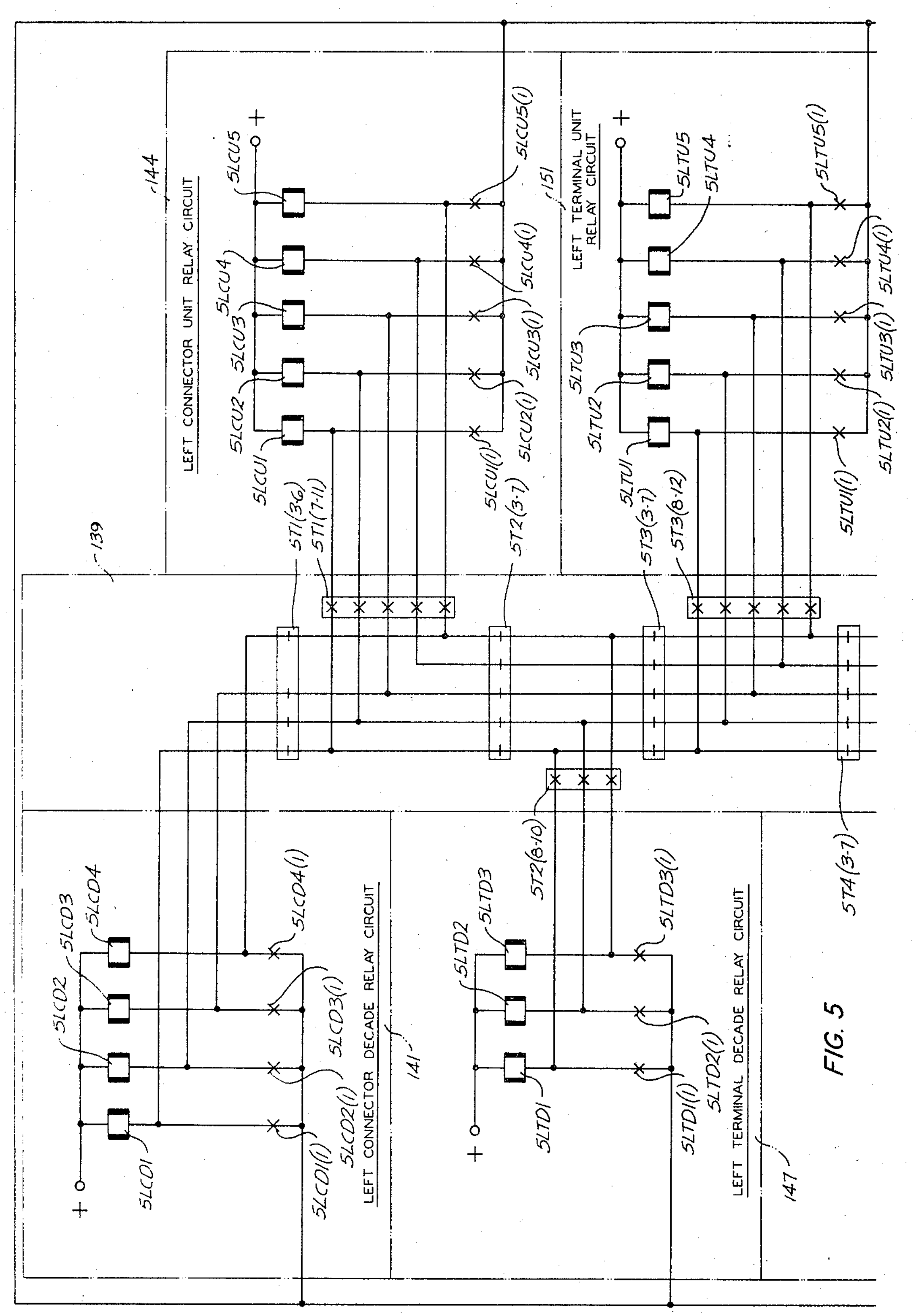

The transfer network 171 includes ten transfer relays 3T1 through 3T10 having associated transfer contacts in the distribution network 139, as shown on FIGS. 3, 4 and 5. It is noted that the sheets containing FIGS. 3, 4 and 5 can be assembled as shown in FIG. 14 to show the manner in which the transfer network 171 and the distribution network 139 cooperate to operate the various selector relay circuits also shown in FIGS. 3, 4 and 5.

A pulsing relay 3P is connected to the sensing finger 183*f* and senses one of the apertures 186 during the reading of each legitimate character whereby the relay operates. The pulsing relay 3P is provided with normally open contacts 3P(1–5) which are connected, respectively, in series with the tape reader outputs *a–e* and control the application of ground to the respective selector relay circuits. Primarily, the pulsing relay 3P and the contracts 3P(1–5) insure the preclusion of the accidental application of ground to the selector relay circuits when the tape 187 is moving between the reading of legitimate characters.

Further, the pulsing relay 3P also has a normally closed contact 3P(6) connected between ground and operating circuits for the transfer relays 3T1 through 3T10. Hence, when the relay 3P is operated, ground is applied to the respective relay selector circuits through the closed contacts 3P(1–5). However, the contact 3P(6) is opened to preclude the operation of the respective transfer relays 3T1 through 3T10. As the aperture 186 passes the sensing fingers 183*f*, operating potential is removed from the pulsing relay 3P and ground is removed from the distribution network 139 by the opening of the contacts 3P(1–5). In addition, the contact 3P(6) closes to operate the selected relay of the transfer relays 3T1 through 3T10 to control associated transfer contacts in the distribution network 139 in preparation for the reading of the next legitimate character. In this manner, accidental operation of the transfer relays 3T1 through 3T10 is precluded during the period when ground is applied to the respective selector relay circuits through the distribution network 139.

Referring to FIG. 5, the left connector decade relay circuit 141 includes a plurality of selector relays 5LCD1 through 5LCD4 having holding contacts 5LCD1(1) through 5LCD4(1), respectively, connected in series with the associated relay coils for locking the relays in an operated state after the relays have responded to instructions from the tape 187. Further, the selector relays 5LCD1 through 5LCD3 are provided with contacts in the left connector decade tree network 142, as shown on FIG. 6, for establishing a circuit path in the selection of a decade digit of the selected left connector lamp 112. In addition, the relays 5LCD1 through 5LCD4 are provided with contacts in the transfer network 171.

Referring again to FIG. 5, the left connector unit relay circuit 144 includes a plurality of selector relays 5LCU1 through 5LCU5 with each relay having an associated contact 6LCU1(1) through 6LCU5(1), respectively, which provide a locking path for the respective relays subsequent to the selection of the relays by instructions from the tape 187. The selector relays 5LCU1 through 5LCU4 are provided with contacts in the left connector unit tree network 146, as shown on FIG. 6, while all the relays 5LCU1 through 5LCU5 are provided with contacts in the transfer network 171.

Referring further to FIG. 5, the left terminal decade relay circuit 147 is provided with a plurality of selector relays 5LTD1 through 5LTD3 having associated contacts 5LTD1(1) through 5LTD3(1), respectively, for holding the associated relays in the operate state subsequent to the instructions from the tape 187 to operate the selected relays. The selector relays 5LTD1 and 5LTD2 are provided with contacts in the left terminal decade tree network 148, as viewed in FIG. 9, for establishing a path in the selection of the decade digit associated with the left terminal lamp. In addition, the relays 5LTD1 through 5LTD3 are provided with contacts in the transfer network 171.

As further shown in FIG. 5, the left terminal unit relay circuit 151 includes a plurality of selector relays 5LTU1 through 5LTU5 which have associated locking contacts 5LTU1(1) through 5LTU5(1), respectively, for locking the selected relays in the operate state subsequent to instructions from the punched tape 187. The selector relays 5LTU1 through 5LTU4 are provided with contacts in the left terminal unit tree network 152 for selecting the unit digit of the selected left terminal lamp 112. Also, the selector relays 5LTU1 through 5LTU5 are provided with contacts in the transfer network 171.

Figure 8:
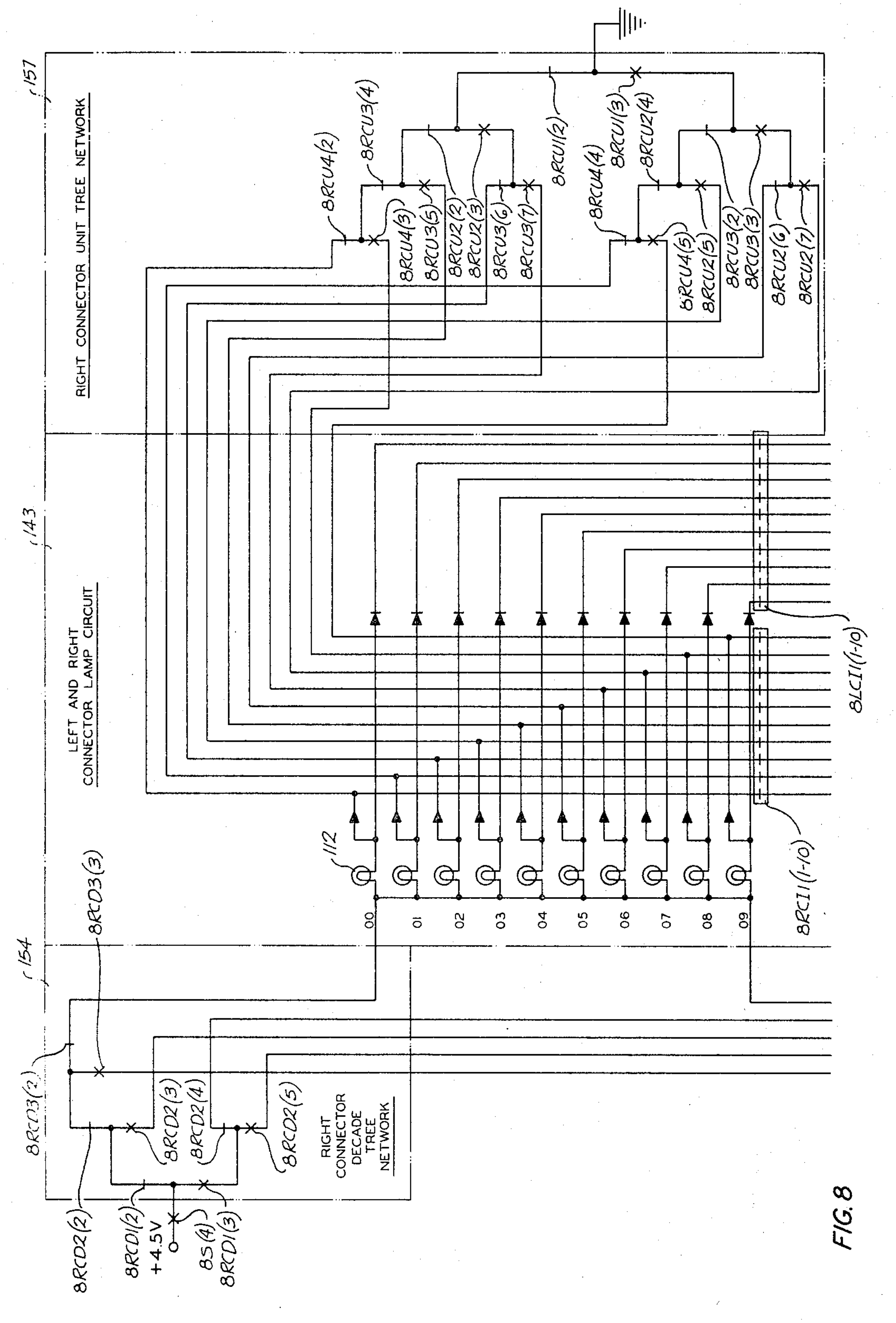

Referring now to FIG. 4, the right connector decade relay circuit 153 includes a plurality of selector relays 4RCD1 through 4RCD4 having contacts 4RCD1(1) through 4RCD4(1), respectively, connected in a locking path for the associated relays for holding the selected relays in the operate state subsequent to the selection of the relays by instructions from the punched tape 187. In addition, the selector relays 4RCD1 through 4RCD3 are provided with contacts in the right connector decade relay circuit 154, as shown in FIG. 8, for establishing a circuit path in the selection of the decade digit of the selected right connector lamp 112. Further, the selector relays 4RCD1 through 4RCD4 are provided with contacts in the transfer network 171.

Referring further to FIG. 4, the right connector unit relay circuit 156 includes a plurality of selector relays 4RCU1 through 4RCU5 having associated contacts 4RCU1(1) through 4RCU5(1) for locking the selected relays in the operate state subsequent to instructions from the tape 187. Further, the selector relays 4RCU1 through 4RCU4 are provided with contacts in the right connector unit tree network 157, as shown in FIG. 8, for establishing a circuit path indicative of the unit digit of the selected right connector lamp. Also, the selector relays 4RCU1 through 4RCU5 have contacts in the transfer network 171.

Figure 10:
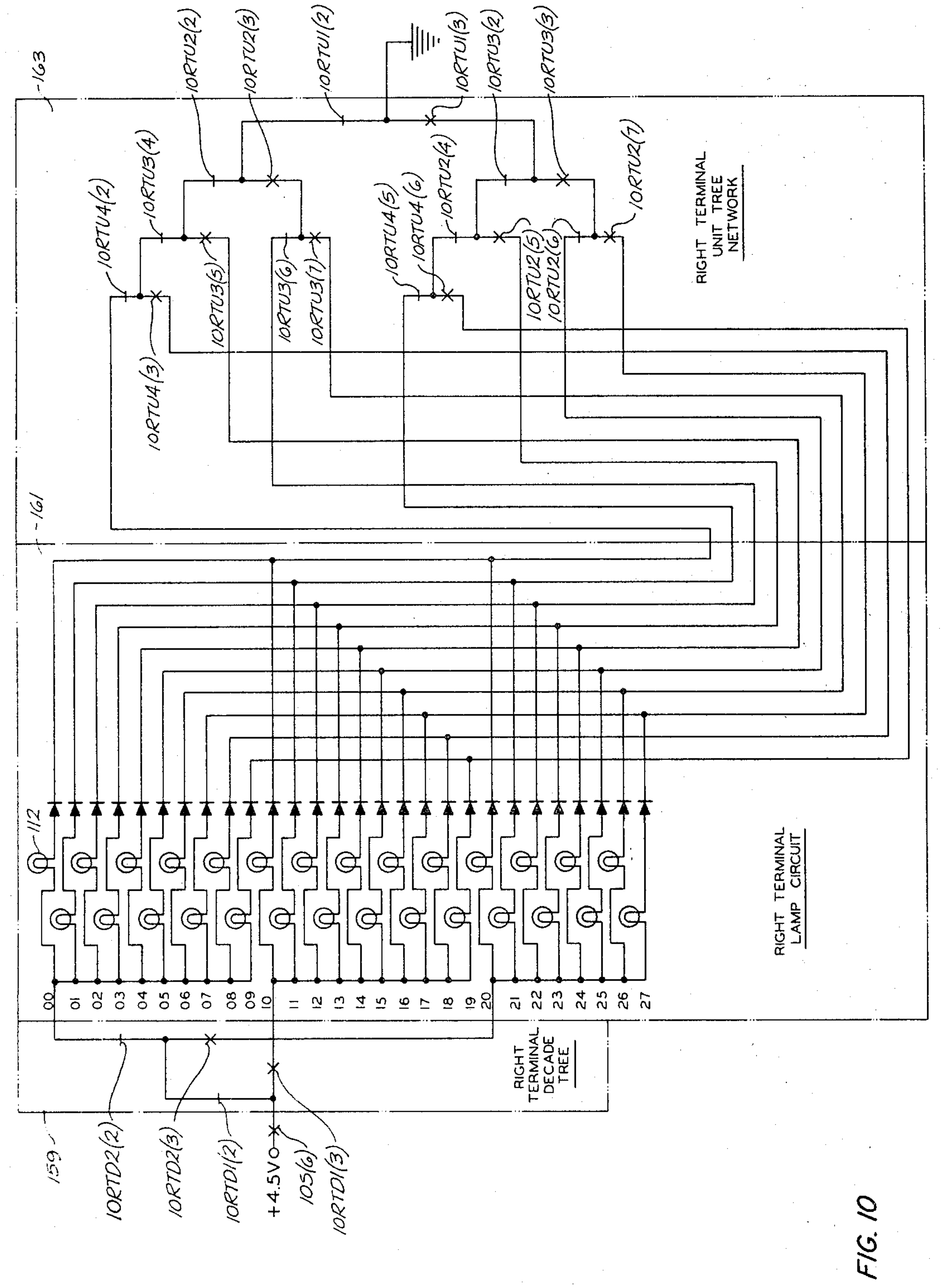

As further shown in FIG. 4, the right terminal decade relay circuit 158 includes a plurality of selector relays 4RTD1 through 4RTD3 having associated contacts 4RTD1(1) through 4RTD3(1), respectively, which lock the selected relays in the operate state subsequent to the selection of the relays upon instructions from the punched tape 187. In addition, the selector relays 4RTD1 and 4RTD2 are provided with contacts in the right terminal decade tree network 159, as shown in FIG. 10, for establishing a circuit path indicative of the decade digit of the selected right terminal lamp 112. Further, the selector relays 4RTD1 through 4RTD3 have contacts in the transfer network 171.

Referring further to FIG. 4, the right terminal unit relay circuit 162 is provided with a plurality of selector relays 4RTU1 through 4RTU5 which have associated locking contacts 4RTU1(1) through 4RTU5(1), respectively, for locking the selected relays in the operate state subsequent to instructions from the punched tape 187. The selector relays 4RTU1 through 4RTU4 are provided with contacts in the right terminal unit tree network 163 for establishing a circuit path for the unit digit of the selected right terminal lamp 112. Additionally, the selector relays 4RTU1 through 4RTU5 have contacts in the transfer network 171.

Figure 11:
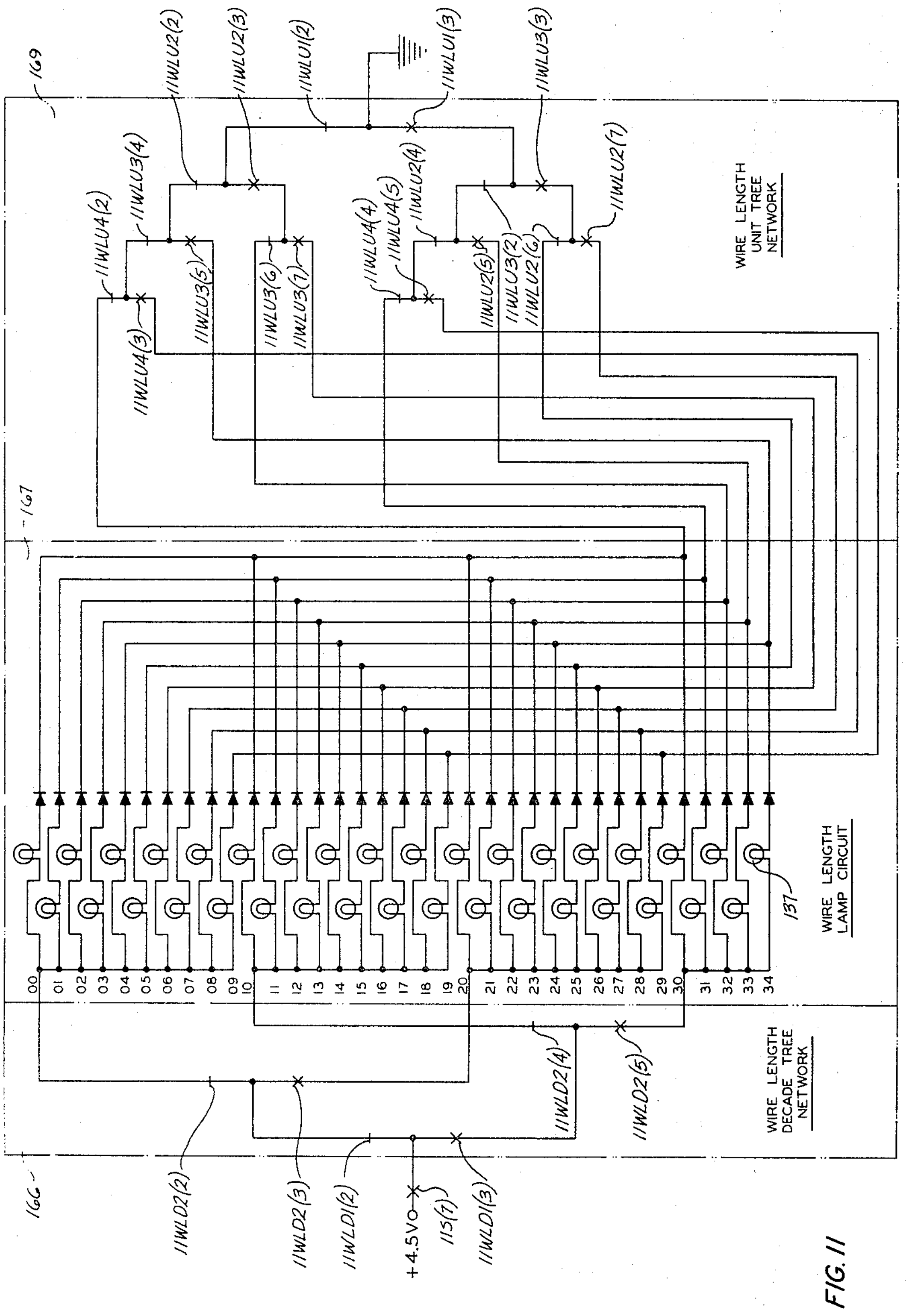

Referring now to FIG. 3, the wire length decade relay circuit 164 is provided with a plurality of selector relays 3WLD1 through 3WLD3 having associated contacts 3WLD1(1) through 3WLD3(1), respectively, for locking the selected relays in the operate state subsequent to the instructions from the punched tape 187. The selector relays 3WLD1 through 3WLD2 are provided with contacts in the wire length decade tree network 166, as shown in FIG. 11, for establishing a circuit path for the decade digit of the wire selector lamp 137. Additionally, the selector relays 3WLD1 through 3WLD3 have contacts in the transfer network 171.

As further shown in FIG. 3, the wire length unit relay circuit 168 is provided with a plurality of selector relays 3WLU1 through 3WLU5 having associated contacts 3WLU1(1) through 3WLU5(1), respectively, for locking the selected relays in the operate state subsequent to instructions from the punched tape 187. The selector relays 3WLU1 through 3WLU4 are provided with contacts in the wire length unit tree network 169 for establishing a circuit path for the unit digit of the selected wire length lamp 137. In addition, the selector relays 3WLU1 through 3WLU5 having contacts in the transfer network 171.

Figure 6:
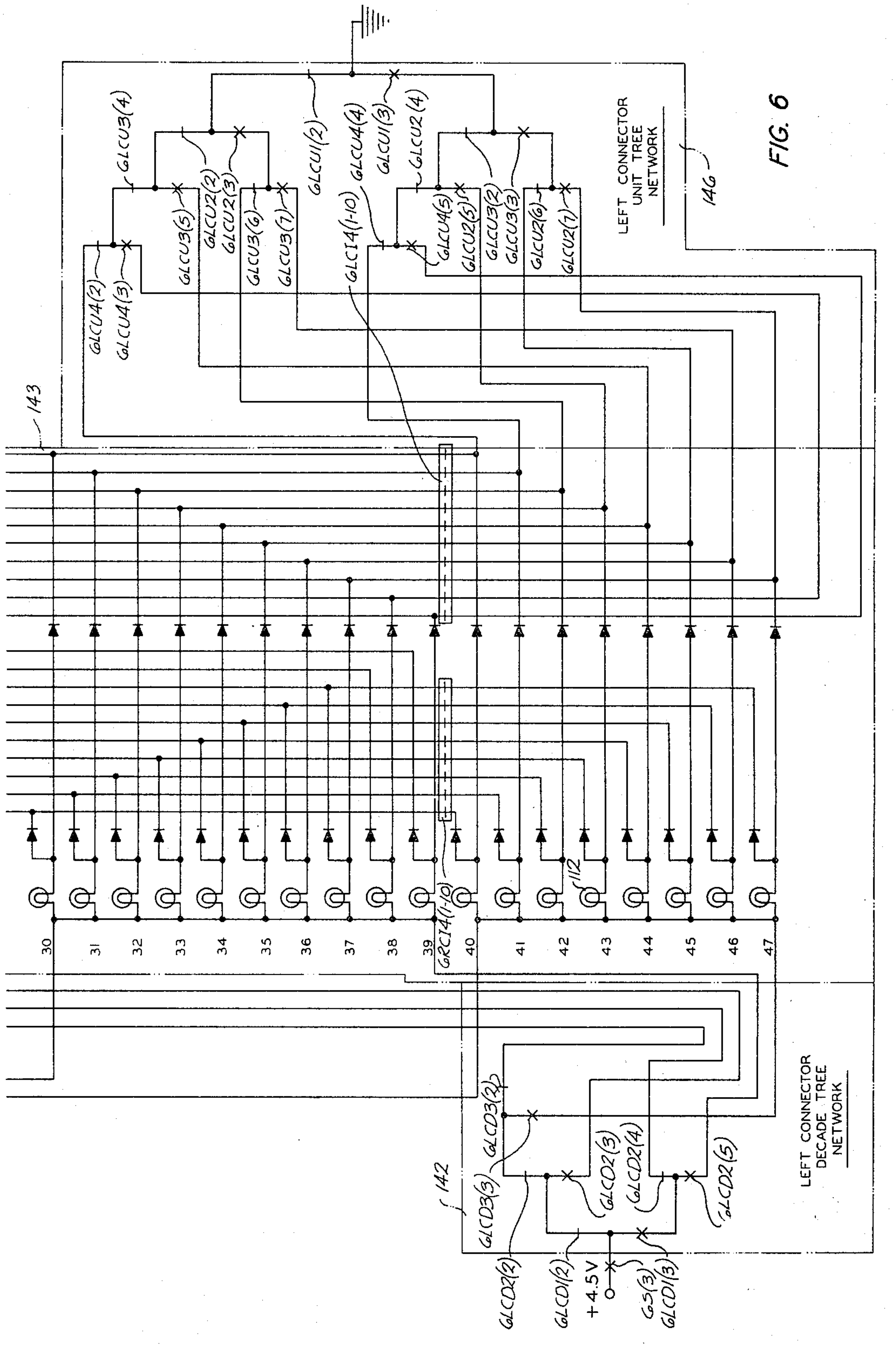
Figure 7:
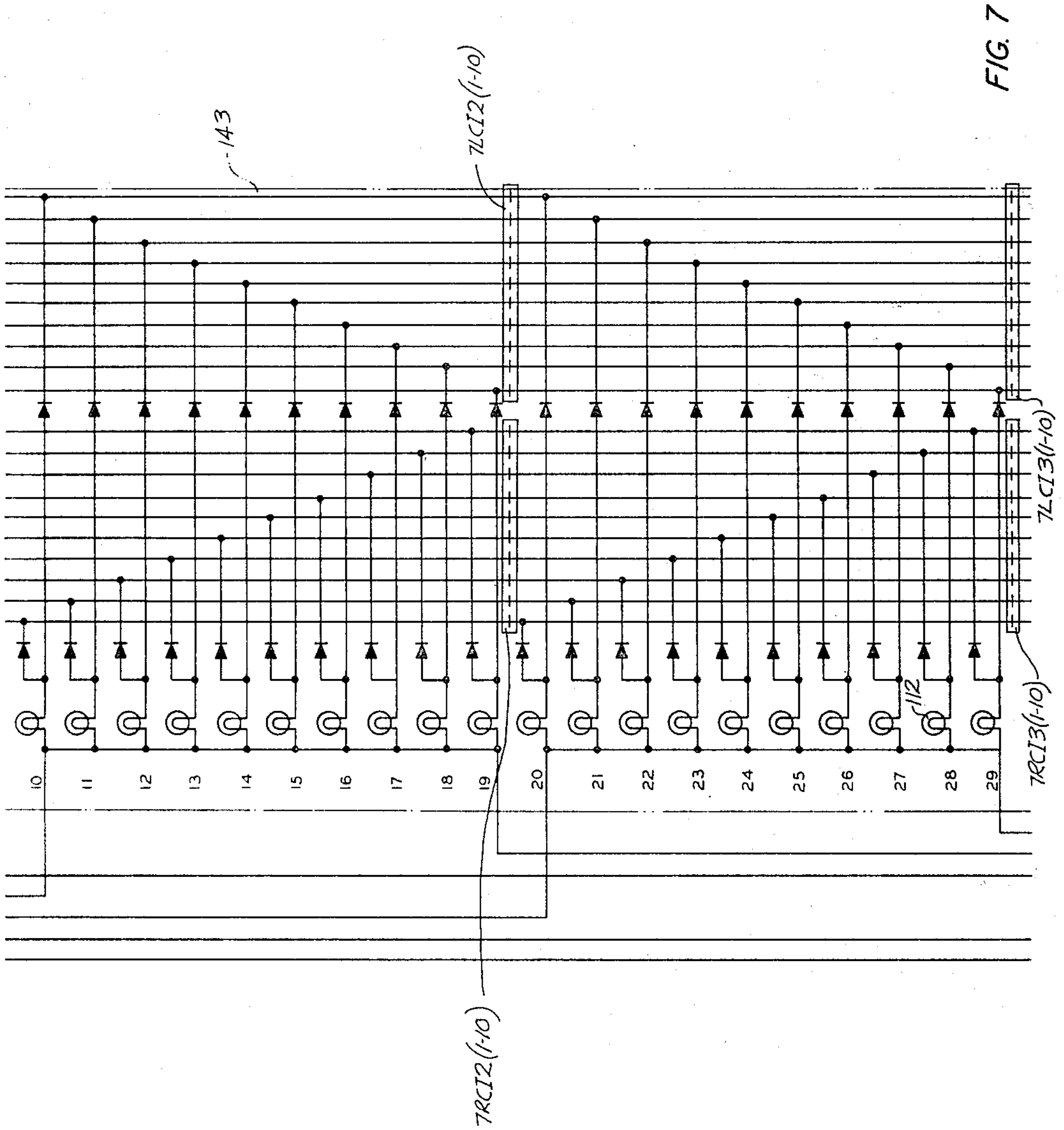
Figures 12, 13:
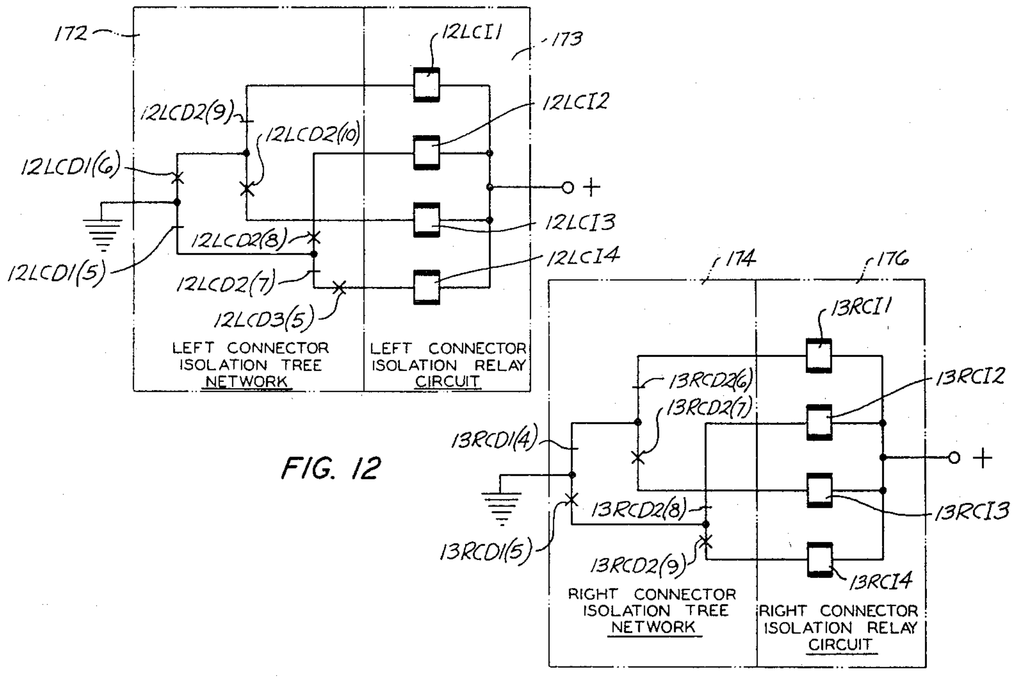

The selector relays 5LCD1 through 5LCD3 also have contacts in the left connector isolation tree network 172, as shown in FIG. 12, which further control relays 12LCI1 through 12LCI4 having contacts in the left and right connector lamp circuit 143, as shown in FIGS. 6, 7 and 8. It is noted that FIGS. 6, 7 and 8 may be combined as shown in FIG. 15 to reveal the complete schematic of the left and right connector lamp circuit 143 and related, controlling tree networks 142, 146, 156 and 157. In addition, the selector relays 4RCD1 through 4RCD3 are provided with contacts in the right connector isolation tree network 174, as shown in FIG. 13, which establish circuit paths for the selective operation of relays 13RCI1 through 13RCI4 having contacts in the connector lamp circuit 143, as shown in FIGS. 6, 7 and 8. As previously noted, the contacts associated with the relays in the isolation circuits 173 and 176 selectively control the operation of the associated contacts in the connector lamp circuit 143, as shown in FIGS. 6, 7 and 8, for isolating the selected right connector lamp 112 and the selected left connector lamp.

In addition, as previously discussed, the selector relays have contacts in the transfer network 171 which are connected in series with the respective transfer relays 3T1 through 3T10 for initially and sequentially conditioning the respective transfer relays for operation when the operating potential is removed from the pulsing relay 3P. For example, the selector relays 5LCD1 through 5LCD4 of the left connector decade relay circuit 141 have contacts 3LCD1(4), 3LCD2(6), 3LCD3(4) and 3LCD4(2), respectively, which are connected in series with the transfer relay 3T1 and are further connected in series with normally closed contact 3P(6). Since the pulsing relay 3P is operated during the reading of each legitimate character and, hence, during the period when the selector relays are initially operated, the transfer relay 3T1 will not operate. However, as the tape 187 advances between the reading of legitimate characters, ground is removed from the pulsing relay 3P and the contact 3P(6) is closed, whereby ground is coupled through the contact 3P(6) and the closed selector relay contacts of the group of contacts 3LCD1(4), 3LCD2(6), 3LCD3(4) and 3LCD4(2) to operate the transfer relay 3T1.

Upon the operation of the transfer relay 3T1, associated contacts of the relay in the distribution network 139 are reversed to disconnect the left connector decade relay circuit 141 from the tape reader 138 and to further connect the tape reader to the left connector unit relay circuit 144. By including the contact 3P(6) of the pulsing relay 3P in the transfer network 171, operation of the transfer relay 3T1 is prevented during the period when the tape reader 138 is connected to the left connector decade relay circuit 141.

In this manner, operation of the transfer relay 3T1 is prevented during the period when ground is connected to the left connector decade relay circuit 141 through the tape reader 138, thereby precluding the possibility of undesirably switching the taped information intended for the left connector decade relay circuit to another selector relay circuit such as the left connector unit relay circuit 144. This pattern of operation of the transfer relays 3T1 through 3T10 is continued throughout the entire character reading cycle. As each of the transfer relays 3T1 through 3T10 is operated, associated locking contacts 3T1(1) through 3T10(1), respectively, are closed for connecting the respective transfer relays to ground through a normally closed relay contact 3R(2) to lock the respective transfer relays in the operate state.

Each of the transfer relays 3T1 through 3T10 is provided with contacts 3T1(2) through 3T10(2) which are connected in series with each other and with the stop relay 3S and further, with the reset contact 3R(2). Upon completion of the sequential closure of the contacts 3T1(2) through 3T10(2), the stop relay 3S is operated to open the stop contact 3S(1), whereby the operating potential is removed from the tape reader motor 191 and the tape reader 138 ceases to operate. In addition, a stop contact 3S(2) is operated for locking the stop relay 3S in the operate state through the reset contact 3R(2), thereby bypassing the series connected transfer contacts 3T1(2) through 3T10(2). Further, the stop relay 3S is also provided with normally open contacts 6S(3), 8S(4), 9S(5), 10S(6) and 11S(7) which precludes the application of operating potential to the lamp circuits 143, 149 and 161 prior to the completion of operating all of the selected connector, terminal and wire length selector relays. Hence, upon the operation of the stop relay 3S, the associated contacts 6S(3), 8S(4), 9S(5), 10S(6) and 11S(7) are closed to simultaneously apply the operating potential to the selected lamps 112 and 137.

Upon the successive completion of the wiring procedure, a detector relay 16D is operated, whereby an associated contact 3D(1), which is connected in series with the reset relay 3R, is closed. Thereafter, the wireman closes an advance switch 193 (FIG. 3) which is connected in series with the detector contact 3D(1) and the reset relay 3R, whereby operating potential is applied to the reset relay to open the contacts 3R(1), thereby precluding the starting of the next tape reading procedure during the reset cycle. In addition, the contact 3R(2) is opened to remove ground from the various, locked selector relays in the relay circuits and the transfer relays. In this manner, all relays in the circuit are released for the next succeeding wiring procedure which is initiated when the wireman releases, and opens, the advance switch 193.

DETAILED TERMINAL SELECTION

As an example of the operation of the terminal selection indicator, the wireman initiates the procedure by closing the start switch 192 (FIG. 3), whereby operating potential is applied to the tape reader motor 191 to move the tape 187. As the tape 187 is moved past the sensing fingers 183, the fingers sense the apertures 186 in the tape 187 and engage the ground bar 188, thereby providing ground to selected, respective tape reader outputs *a* through *f*.

Initially, the sensing finger 183*f* engages the ground bar 188 to connect ground to the pulsing relay 3P whereafter the relay operates to close contacts 3P(1–5) and to open contact 3P(6), whereby the tape reader outputs *a–e* are connected to the distribution network 139. The opening of the contact 3P(6) prevents the operation of any of the transfer relays 3T1–3T10 during the period when the selector relays are being selected and operated. Assuming the decade digit 4 is to be selected for the left connector decade, as the sensing finger 183*f* engages the ground bar 188, the sensing finger 183*c* simultaneously engages the ground bar, whereby the selector relay 5LCD3 is connected to ground through normally closed contacts 5T1(5), 5T2(5), 5T3(5), 5T4(5), 4T5(5), 4T6(5), 4T7(5), 3T8(5), 3T9(5), 3T10(5) and closed contact 3P(3). Since the opposite side of the selector relay 5LCD3 is connected to the positive potential, the relay is operated, whereby the contact 5LCD3(1) is closed to connect the associated relay to ground through the normally closed reset contact 3R(2). In this manner, the relay 5LCD3 remains in the operate state after ground, which is supplied through the tape reader 138 and the distribution network 139, has been removed through movement of the tape 187 and opening of the contacts 3P(1–5).

As the relay 5LCD3 is operated, an associated contact 6LCD(3) is closed and a normally closed associated contact 6LCD3(2) is opened, whereby a circuit path is established in the left connector decade tree network 142 for selecting the number 4 decade section of the left and right connector lamp circuit 143. The established circuit path includes the normally closed contacts 6LCD1(2), 6LCD2(2) and the closed contact 6LCD3(3).

In addition to the closure of the previously discussed contacts, upon the operation of the relay 5LCD3, an associated contact 3LCD3(4), which is in series with the transfer relay 3T1 and the open contact 3P(6), is also closed to condition the transfer relay 3T1 for operation when the contact 3P(6) is subsequently closed. As the tape 187 advances between the reading of legitimate characters, the fingers 183*c* and 183*f* become disengaged from the ground bar 188, whereby the relay 3P is rendered inoperative. As the relay 3P is rendered inoperative, the contact 3P(6) closes, whereby the transfer relay 3T1 is connected to ground and is operated thereby. In addition, the contacts 3P(1–5) are opened to preclude the possibility of ground being accidentally applied to the selector relay circuits through the distribution network 139 during the period when the tape 187 is moving between the supplying of character information to the tape reader 138. As the transfer relay 3T1 is operated, the associated locking contact 3T1(1) is closed to provide another path to ground for the relay through the reset contact 3R(2), thereby insuring retention of the relay in the operate state even though the contacts 3LCD3(4) or 3P(6) subsequently open.

Further, upon operation of the transfer relay 3T1, associated contacts 5T1(3–6) are opened and contacts 5T1(7–11) are closed, whereby the selector relays associated with the left connector decade relay circuit 141 are disconnected from the distribution network 139 and the selector relays associated with the left connector unit relay circuit 144 are connected to the distribution network to receive the next instruction from the punched tape 187.

In addition, the transfer contact 3T1(2) is closed. However, this contact is connected in series with normally open contacts associated with the remaining transfer relays 3T2 through 3T10. It is also connected in series with the stop relay 3S. Since the remaining transfer contacts are open, the stop relay 3S is not operated at this time.

The selector relay 5LCD3 is also provided with a normally open contact 12LCD3(5) in the left connector isolation tree network 172 where, upon operation of the relay, the contact closes to complete a circuit path within the tree network for operating the left connector isolation relay 12LCI4 in the left connector isolation relay network 173. As the relay 12LCI4 is operated, normally closed, associated contacts 6LCI4(1–10) are opened to preclude the possibility of the establishment of a circuit path which would include the right connector decade tree network 154, the lamp circuit 143 and the left connector unit tree network 146. It is apparent that if the isolation contacts 6LCI4(1–10) were not included in the lamp circuit 143, the right connector decade selection circuit path could be completed through the left connector unit circuit path, thereby possibly and erroneously illuminating one of the connector lamps 112.

As an example of such erroneous selection of one of the connector lamps 112, assume that the circuit path established in the right connector decade tree network 154 provides a complete path to the lamps 112 included in the lamp section associated with the decade digit number 2. Since the circuit path also previously established in the left connector tree network 146 is the selection of the unit digit number 1, a circuit path would be completed through the lamp 112 which designates the selection of the connector lamp designated number 21. Subsequently, another circuit path would be completed through the right connector tree network 157 upon instructions from the tape. Assuming that the right connector unit digit is a number other than 1, for example 3, another circuit path is completed through the lamp circuit 143, whereby the lamp 112, designated by the selection number 23, is illuminated.

Hence, without the presence of the isolation contacts, it is possible that four connector lamps 112 would be illuminated, thereby providing an erroneous and confusing display for the wireman. However, as previously discussed, the presence of the isolation contacts, such as contacts 6LCI4(1–10) preclude the possibility of the selection of extra lamps for each of the right and left connector lamp selection. As the tape 187 is positioned beneath the sensing fingers 183 to read the next character, the sensing finger 183*f* engages the ground bar 188 to connect ground to the pulsing relay 3P, thereby operating the relay. As the relay 3P operates the contacts 3P(1–5) are closed and the contact 3P(6) is opened, whereby the tape reader outputs *a–e* are connected to the distribution network 139. In addition, the opening of the contact 3P(6) prevents the application of ground to the transfer network 171 until after the selector relays of the relay circuit 144 have been selected.

Assuming that the left connector unit digit is the number 1, as the finger 183*f* engages the ground bar 188, the sensing finger 183*a* simultaneously senses one of the apertures 186 of the punched tape 187 and also engages the ground bar, whereby ground is connected to the selector relay 5LCU1 through the closed contact 5T1(7), the normally closed contacts 5T2(3), 5T3(3), 5T4(3), 4T4(3), 4T5(3), 4T6(3), 4T7(3), 3T8(3), 3T9(3), 3T10(3) and the closed contact 3P(1). Since the opposite side of the selector relay 5LCU1 is connected to the positive potential, the relay is operated, whereby the locking contact 5LCU1(1) is closed to provide ground for the locking circuit through the normally closed reset contact 3R(2). In this manner, the selector relay 5LCU1 will remain in the operate state subsequent to the removal of ground through the tape reader 138 and the distribution network 139.

Upon operation of the selector relay 5LCU1, the normally closed contact 6LCU1(2) is opened and the normally opened contact 6LCU1(3) is closed, thereby establishing a circuit path in the left connector unit tree network 146 for selecting the left connector unit digit 1 of the selected left connector lamp 112. The established circuit path of the tree network 146 includes the closed contact 6LCU1(3), the normally closed contacts 6LCU3(2), 6LCU2(4) and 6LCU4(4). As the contact 6LCU1(3) is closed, a complete circuit path is estabished through the left connector decade tree network 142, the selected lamp 112, designated by the number 41, of the lamp circuit 143 and the circuit path in the left connector unit tree network 146 where, upon subsequent closure of the stop contact 6S(3), illuminating potential is applied to the selected lamp 112 to indicate selection of the left connector digit 41.

As the selector relay 5LCU1 is operated, the normally open, associated contact 3LCU1(4) is closed to condition the transfer relay 3T2 for operation when the contact 3P(6) is closed. As the tape 187 advances between the reading of character information the sensing fingers 183*a* and 183*f* are disengaged from the ground bar 188. In this manner, the pulsing relay 3P is rendered inoperative and the contact 3P(6) is closed, whereby the transfer relay 3T2 is connected to ground and is operated. In addition, the contacts 3P(1–5) are opened to disconnect the tape reader from the distribution network 139. As the relay 3T2 is operated, the contact 3T2(1) is closed to provide a locking path for the relay through the normally closed reset contact 3R(2), whereby the relay remains in the operate state even though the contacts 3LCU1(4) or 3P(6) subsequently open. In addition, the operation of the relay 3T2 results in the closure of the normally open contact 3T2(2).

Further, as the relay 3T2 is operated, the normally closed associated contacts 5T2(3–7) are opened to disconnect the relays of the left connector unit relay circuit 144 from the distribution network 139. However, the operated relay 5LCU1 is connected to ground through the locking circuit of contact 5LCU1(1) and reset contact 3R(2) to remain in the operate state. In addition, the normally open contacts 5T2(8–10) are closed to facilitate the connection of the relays of the left terminal decade relay circuit 147 to the distribution network 139.

Subsequently, the sensing finger 183*f* senses one of the apertures 186 and engages the ground bar 188, whereby the relay 3P is operated to close contacts 3P(1–5) and to open contact 3P(6). Closure of contacts 3P(1–5) connects the tape reader outputs *a–e* to the distribution network 139 while the opening of the contact 3P(6) prevents the application of ground to the relays of the transfer network 171 until after the selector relays of the relay circuit 147 have been selected.

Assuming that the number 2 is the selected left terminal decade digit, as the sensing finger 183*f* engages the ground bar 188, the sensing finger 183*b* simultaneously senses one of the apertures 186 in the punched tape 187 and engages the ground bar. Ground is thereby connected to the selector relay 5LTD2 through a circuit path which includes the closed contact 5T2(9), the normally closed contacts 5T3(4), 5T4(4), 4T5(4), 4T6(4), 4T7(4), 3T8(4), 3T9(4), 3T10(4) and closed contact 3P(2). Since the opposite side of the selector relay 5LTD2 is connected to the positive potential, the relay is operated, whereby the locking contact 5LTD2(1) is closed to connect ground to the locking circuit through the normally closed reset contact 3R(2), thereby retaining the relay in the operate state subsequent to the removal of ground through the tape reader 138 and the distribution network 139.

As the selector relay 5LTD2 is operated, the normally closed contact 9LTD2(2) is opened and the normally open contact 9LTD2(3) is closed to establish a circuit path in the left terminal decade tree network 148 for selecting the lamp section associated with the decade digit 2 of the left terminal lamp circuit 149. The selected circuit path includes the normally closed contact 9LTD1(2) and the closed contact 9LTD2(3).

In addition, as the selector relay 5LTD2 is operated, the normally open associated contact 3LTD2(4) is closed to condition the transfer relay 3T3 for operation upon the subsequent closing of the contact 3P(6) As the tape 187 moves, the sensing fingers 183*f* and 183*b* disengage from the ground bar 188 and the relay 3P is rendered inoperative, whereby the contacts 3P(1–5) are opened to disconnect the tape reader 138 from the distribution network 139. Also, the contact 3P(6) is closed, whereby the transfer relay 3T3 is connected to ground to operate the relay. Upon operation of the relay 3T3, the normally open contact 3T3(1) is closed to establish a locking circuit to ground through the normally closed reset contact 3R(2) for the relay 3T3. In addition, as the relay 3T3 is operated, the normally open contact 3T3(2) is closed.

Upon the operation of the transfer relay 3T3, the normally closed associated contacts 5T3(3–7) are opened to disconnect the relays in the left terminal decade relay circuit 147 from the distribution network 139. However, the selector relay 5LTD2 remains in the operated state because the relay is connected to ground through the locking circuit which includes the close contact 5LTD2(1) and normally closed reset contact 3R(2). In addition, normally open associated contacts 5T3(8–12) are closed to facilitate the connection of the relays of the left terminal unit relay circuit 151 to the distribution network 139.

Thereafter, the tape 187 again presents character information to the tape reader 138, whereby the sensing finger 183*f* engages the ground bar 188 through one of the tape apertures 186, whereby the pulsing relay 3P is operated. As the relay 3P is operated, the contacts 3P(1–5) are closed to connect the tape reader 138 to the distribution network 139. Also, the contact 3P(6) is opened to prevent the application of ground to the relays of the transfer network 171 when the selector relays of the relay circuit 151 are being selected.

Assuming that the number 3 is the selected left terminal digit, as the tape reader 138 steps to the next bit of information, the sensing fingers 183*a* and 183*b* sense apertures 186 in the punched tape 187 and engage the ground bar 188 simultaneously with the sensing finger 183*f*. Ground is coupled through the tape reader 138 and the distribution network 139 to the selector relays 5LTU1 and 5LTU2 through a circuit path which includes the respective closed contacts 5T3(8 and 9), the respective normally closed contacts 5T4(3 and 4), 4T5(3 and 4), 4T6(3 and 4), 4T7(3 and 4), 3T8(3 and 4), 3T9(3 and 4), 3T10(3 and 4) and the respective closed contacts 3P(1 and 2). Since the opposite sides of the selector relays 5LTU1 and 5LTU2 are connected to the positive potential, the relays are operated, whereby the associated locking contacts 5LTU1(1) and 5LTU2(1), respectively, are closed to connect ground to the relays through the normally closed reset contact 3R(2). In this manner, the selector relays 5LTU1 and 5LTU2 are retained in the operate state subsequent to the removal of ground through the tape reader 138 and the distribution network 139.

Figure 9:
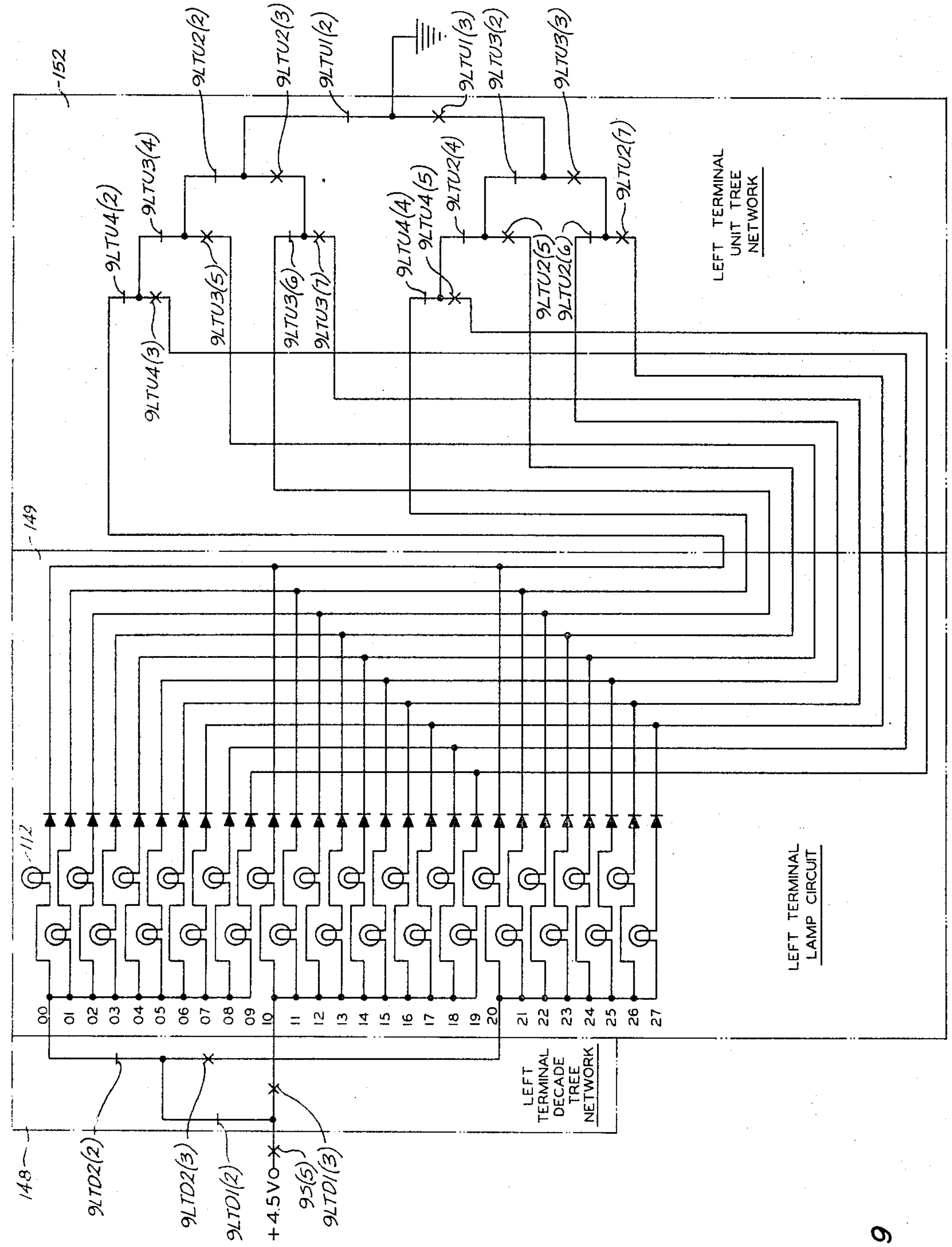

As the selector relays 5LTU1 and 5LTU2 are operated, associated contacts appearing in the left terminal unit tree network 152 are reversed from the state, as shown in FIG. 9. In this manner, contacts 9LTU1(3) and 9LTU(5) are closed to establish a circuit path in the tree network 152 representative of the unit digit 3. The established circuit path includes the closed contact 9LTU1(3), the normally closed contact 9LTU3(2) and the closed contact 9LTU2(5). As the circuit path in the tree network 152 is completed, an illuminating path for the lamp 112, designated by the number 23, is completed and includes the previously selected path in the tree network 148, the selected lamp 112 of the lamp circuit 149 and the selected circuit path of the tree network 152. Upon subsequent operation of the stop relay 3S, the contact 9S(5) is closed, whereby illuminating potential is applied to the lamp 112, desginated by the number 23, thereby indicating the left terminal selection.

As the selector relay 5LTU1 and 5LTU2 are operated, associated contacts 3LTU1(4) and 3LTU2(8), respectively, are closed thereby conditioning the transfer relay 3T4 for operation upon the subsequent closing of the contact 3P(6). Subsequently, the character reading cycle is completed and the tape 187 moves to approach another character reading cycle. As the tape 187 moves, the sensing fingers 183*a*, 183*b* and 183*f* disengage from the ground bar 188, whereby the relay 3P is rendered inoperative. In this manner, the contacts 3P(1–5) are opened to disconnect the tape reader 138 from the distribution network 139. Also the contact 3P(6) is closed to facilitate the application of ground to the transfer relay 3T4, whereby the relay is operated. As the relay 3T4 is operated, the contact 3T4(1) is closed to complete a locking circuit to ground for the relay through the normally closed reset contact 3R(2). In addition, the contact 3T4(2) is closed.

Further, as the relay 3T4 is operated, the normally closed contacts 5T4(3–7) are opened, thereby disconnecting the relays of the left terminal unit relay circuit 151 from the distribution network 139. However, the selector relays 5LTU1 and 5LTU2 remain in the operate state because the relays are connected to ground through the respective locking circuits which includes the closed contacts 5LTU1(1) and 5LTU2(1), respectively, and the normally closed reset contact 3R(2). In addition, the normally open contacts 4T4(8–11) are closed to connect the relays of the right connector decade relay circuit 153 to the distribution network 139.

Thereafter, the tape 187 is positioned so that the sensing finger 183*f* senses one of the apertures 186 and engages the ground bar 188, whereby ground is applied to the relay 3P to operate the relay. As the relay 3P is operated, the contacts 3P(1–5) are opened. Closure of the contacts 3P(1–5) connects the tape reader outputs *a–e* to the distribution network 139 while the opening of the contact 3P(6) precludes the possibility of ground being connected to the relays of the transfer network 171 until after the selector relays of the relay circuit 153 have been selected.

Assuming that the number 0 is the selected decade digit for the right connector, the sensing finger 183*e* senses one of the apertures 186 in the punched tape 187 and engages the ground bar 188 simultaneously with the finger 187*f*. The selector relay 4RCD4 is connected to ground of the tape reader 138 through a circuit path which includes the closed contact 474(11), the normally closed contacts 4T5(7), 4T6(7), 4T7(7), 3T8(7), 3T9(7), 3T10(7) and the closed cotact 3P(5). Since the opposite side of the selector relay 4RCD4 is connected to the positive potential, the relay is operated, whereby the locking contact 4RCD4(1) is closed to connect ground to the relay through the normally closed reset contact 3R(2), thereby retaining the relay in the operate state subsequent to the removal of ground through the tape reader 138 and the distribution network 139.

Since the selector relay 4RCD4 does not have any contacts in the right connector decade tree network 159, the circuit path which is normally established in the tree network functions as the selected path representative of the selected right connector decade digit 0. Hence, the selected circuit path for the tree network 154 includes the normally closed contacts 8RCD1(2), 8RCD2(2) and 8RCD3(2), whereby the bank of lamps 112 associated with the decade digit 0 are selected in the lamp circuit 143.

In addition, since none of the selector relays of the right connector decade relay circuit 153 are operated, a normally established circuit path in the right connector isolation tree network includes the normally closed contacts 13RCD1(4) and 13RCD2(6), whereby the isolation relay 13RCI1 in the right connector isolation relay 176 is operated.

As the relay 13RCI1 is operated, normally closed contacts 8RCI1(1–10) are opened to isolate the circuit path established in the left connector decade tree network 142 from the subsequently selected circuit path to be established in the right connector unit tree network 157. In this manner, the establishment of an extra circuit path through the combination of the left connector decade tree network 142, the lamp circuit 143 and the right connector unit tree network 157 is prevented, thereby assuring the illumination of the proper number of selected connector lamps 112.

The operation of the selector relay 4RCD4 is necessary to close associated contact 3RCD4(2) for conditioning the transfer relay 3T5 for operation upon subsequent closure of the contact 3P(6). It is noted that when the selected digit for any of the lamp circuits is 0, the relays of the relay circuits which are associated with the contacts in the respective tree networks are not operated. Hence, the transfer relays 3T1 through 3T10 would also remain inoperative since the operation of the transfer relays depends upon the operation of the selector relays of the various relay circuits. Therefore, it is necessary to include an additional relay in each of the selector relay circuits which responds to instructions from the tape 187 for facilitating the operation of the respective transfer relay in the event that the related selector relays of the same relay circuit are not operated. In the present example, the number 0 is the selected right connector decade digit, therefore, the selector relays of the right connector decade relay circuit 153 are not operated. However, the selector relay 4RCD4 is operated to close the associated contact 3RCD4(2), thereby conditioning the transfer relay 3T5 for operation.

Upon completion of the reading of the character, the tape 187 moves to position the tape for another character reading cycle. As the tape 187 moves between character reading cycles, the fingers 183*e* and 183*f* disengage from the ground bar 188 and the relay 3P is rendered inoperative, whereby the contacts 3P(1–5) are opened to disconnect the tape reader 138 from the distribution network 139. In addition, the contact 3P(6) is closed to connect the transfer relay 3T5 to ground, whereby the relay is operated.

As the relay 3T5 is operated, the associated contact 3T5(1) is closed to connect ground to the relay through the normally closed reset contact 3R(2) to provide a locking circuit for the relay. In addition, the normally open, associated contact 3T5(2) is closed.

The normally closed contacts 4T5(3–7) are also opened upon the operation of the relay 3T5, whereby the relays of the right connector decade relay circuit 153 are disconnected from the distribution network 139. However, the selector relay 4RCD4 remains in the operate state because the relay is connected to ground through the locking circuit which includes the closed contact 4RCD4(1) and the normally closed, reset contact 3R(2). In addition, the normally open associated contacts 4T5(8–12) are closed to connect the relays of the right connector unit relay circuit 156 to the distribution network 139.

Subsequently, the sensing finger 183*f* again senses one of the apertures 186 in the tape 187 and engages the ground bar 188, whereby the pulsing relay 3P is operated. As the relay 3P is operated, associated contacts 3P(1–5) are closed to connect the tape reader 138 to the distribution network 139. In addition, the contact 3P(6) is opened to prevent the connecting of ground to the relays of the transfer network 171 during the period when the selector relays of the relay circuit 156 are being selected.

Assuming that the number 7 is the selected right connector unit digit, the sensing fingers 183*a*, 183*b* and 183*c* sense apertures 186 in the punched tape 187 and engage the ground bar 188 simultaneously with the finger 183*f*. In this manner, ground is connected to the selector relays 4RCU1, 4RCU2 and 4RCU3 through respective sets of contacts which include closed contacts 4T5(8–10), the normally closed contacts 4T6(3–5), 4T7(3–5), 3T8(3–5), 3T9(3–5), 3T10(3–5) and the closed contacts 3P(1–3). Since the opposite sides of the selector relays 4RTU1, 4RTU2 and 4RTU3 are connected to the positive potential, the relays are operated, whereby locking contacts 4RCU1(1), 4RCU2(1) and 4RCU3(1), respectively, are closed to connect ground to the respective relays through the normally closed, reset contact 3R(2). In this manner, the selected relays 4RCU1, 4RCU2 and 4RCU3 are retained in the operate state subsequent to the removal of ground through the tape reader 138 and the distribution network 139.

As the selector relays 4RCU1, 4RCU2 and 4RCU3 are operated, associated contacts of the right connector unit tree network 157 are reversed from the condition, as shown in FIG. 8, whereby a circuit path is established in the tree network to complete the selection of the right connector unit digit 7. The selected circuit path of the tree network 157 includes the closed contacts 8RCU1(3), 8RCU3(3) and 8RCU2(7).

Completion of the selection of the circuit path in the tree network 157 completes the selection of the circuit path for the right connector lamp 112, designated by the number 07, and includes the completed circuit path of the right connector decade tree network 154, the selected lamp 112, designated by the number 07, of the lamp circuit 143 and the completed circuit path of the right connector unit tree network 157. When a complete set of instructions have been provided for the surface wiring assist device by the tape 187, the stop relay 3S will operate, whereby the contact 8S(4) will close whereby illuminating potential will be applied to the selected lamp 112, designated by the number 07.

It is noted that since the isolation contacts 6LCI4(1–10) have been previously opened as discussed, the selected circuit path of the right connector decade tree network 154 cannot be connected to the selected circuit path of the left connector unit tree network 146, thereby precluding the possible illumination of the lamp 112, designated by the number 01. In addition, opening of the isolation contacts 8RCI1(1–10) precludes the possibility of the selected circuit path of the left connector decade tree network 143 being connected to the selected circuit path of the right connector unit tree network 157 through the lamp circuit 143 to illuminate the lamp 112, designated by the number 47.

As the selector relays 4RCU1, 4RCU2 and 4RCU3 are operated, associated contacts 3RCU1(4), 3RCU2(8) and 3RCU3(8), respectively, are closed to condition the transfer relay 3T6 for operation upon the subsequent closure of the contact 3P(6). Upon completion of the character reading cycle, the tape 187 moves so that the sensing fingers183*a*, 138*b*, 183*c* and 183*f* disengage from the ground bar 188, whereby the relay 3P is rendered inoperative. As the relay 3P is rendered inoperative, the contacts 3P(1–5) are opened to disconnect the tape reader 138 from the distribution network 139. Further, the contact 3P(6) is closed, whereby the transfer relay 3T6 is connected to ground to operate the relay.

Upon operation of the transfer relay 3T6, the associated locking contact 3T6(1) is closed to connect the relay to ground through the normally closed reset contact 3R(2). In this manner, the relay 3T6 is retained in the operate state subsequent to the opening of contacts 3RCU1(4), 3RCU2(8) and 4RCU3(8). In addition, the normally open contact 3T6(2) is closed.

The associated normally closed transfer contacts 4T6(3–7) are opened upon the operation of transfer relay 3T6, whereby the relays of the right connector unit relay circuit 156 are disconnected from the distribution network 139. However, the selector relays 4RCU1, 4RCU2 and 4RCU3 remain in the operate state because the relays are connected to ground through respective locking contacts 4RCU1(1), 4RCU2(1) and 4RCU3(1) and the normally closed, reset contact 3R(2). In addition, the normally open associated contacts 4T6(8–10) are closed to connect the relays of the right terminal decade relay circuit 158 to the distribution network 139.

As the tape 187 approaches another character reading cycle, the sensing finger 183*f* senses one of the tape apertures 186 and engages the ground bar 188, whereby the pulsing relay 3P is operated. Upon operation of the relay 3P, the contacts 3P(1–5) are closed to connect the tape reader 138 to the distribution network 139. Further, the contact 3P(6) is opened to prevent the connecting of ground to the relays of the transfer network 171 during the period when the selector relays of the relay circuit 158 are being selected.

Assuming that the digit 0 is the selected right terminal decade digit, the tape 187 does not provide instructions to the selector relays of the right terminal decade relay circuit 158, thereby indicating that the normally established circuit in the right terminal decade tree network 159 is the selected circuit path representative of the decade digit 0. The normally established circuit path of the tree network 159 includes the normally closed contacts 10RTD1(2) and 10RTD2(2) which is connected to the lamps 112 of the lamp circuit 161 associated with the decade digit 0.

However, the transfer contacts of the transfer relay 3T7 must be reversed to facilitate advancement of the wiring indicating procedure. Therefore, the sensing finger 183*e* senses one of the apertures 186 of the punched tape 187 and engages the ground bar 188 simultaneously with the finger 183*f*. The selector relay 4RTD3 is connected to ground in the tape reader 138 through a circuit path which includes the closed contact 4T6(10), the normally closed contacts 4T7(7), 3T8(7), 3T9(7), 3T10(7) and the closed contact 3P(5). Since the opposite side of the selector relay 4RTD3 is connected to the potential, the relay is operated, whereby the locking contact 4RTD3(1) is closed to connect ground to the relay through the normally closed reset contact 3R(2). In this manner, the locking circuit is provided for the relay 4RTD3 which is retained in the operate state subsequent to the removal of the ground through the tape reader 138 and the distribution network 139.

Upon operation of the selector relay 4RTD3, the associated contact 3RTD3(2) is closed to condition the transfer relay 3T7 for operation upon subsequent closure of the contact 3P(6). As the tape 187 moves so that the apertures 186 are moved away from the sensing fingers 183*e* and 183*f*, ground is disconnected from the relay 3P and the relay is rendered inoperative, whereby the contacts 3P(1–5) are opened and the contact 3P(6) is closed. As the contacts 3P(1–5) are opened, the tape reader 138 is disconnected from the distribution network 139. Further, as the contact 3P(6) is closed, the transfer relay 3T7 is connected to ground, whereby the relay is operated. As the relay 317 is operated, the locking contact 3T7(1) is closed to connect the relay to ground through the normally open reset contact 3R(2). In addition, the normally open transfer contact 3T7(2) is closed.

Upon operation of the transfer relay 3T7, the normally closed contacts 4T7(3–7) are opened to disconnect relays of the relay circuit 158 from the distribution network 139. However, the selector relay 4RTD3 remains in the operate state because the relay is connected to ground through the locking circuit which includes the closed contact 4RTD3(1) and the normally closed contact 3R(2). In addition, the normally open associated transfer contacts 4T7(8–12) are closed to connect the relays of the right terminal unit relay circuit 162 to the distribution network 139.

Subsequently, the tape 187 again presents a character, in the form of the apertures 186, to the tape reader 138, whereby the sensing finger 183*f* senses one of the apertures and engages the ground bar 188. In this manner, the relay 3P is connected to ground and is operated, whereby contacts 3P(1–5) are closed to connect the tape reader 138 to the distribution network 139. In addition, the contact 3P(6) is opened to prevent the connecting of ground to the relays of the transfer network 171 during the period when the selector relays of the relay circuit 162 are being selected.

Assuming that the digit 5 is the selected right terminal unit digit, the sensing fingers 183*a* and 183*c* sense apertures 186 in the tape 187 and engage the ground bar 188 simultaneously with the finger 183*f*. In this manner, the selector relays 4RTU1 and 4RTU3 are connected to ground through a circuit path which includes the respective, closed contacts 4T7(8 and 10), the respective, normally closed contacts 3T8(3 and 5) 3T9(3 and 5), 3T10 (3 and 5) and the respective, closed contacts 3P(1 and 3). Since the opposite sides of the selector relays 4RTU1 and 4RTU3 are connected to the positive potential, the relays are operated, whereby the locking contacts 4RTU1(1) and 4RTU3(1), respectively, are operated to connect the relays to ground through the normally closed reset contact 3R(2). In this manner, the selector relays 4RTU1 and 4RTU3 are retained in the operate state subsequent to the removal of ground through the tape reader 138 and the distribution network 139.

Upon operation of the selector relays 4RTU1 and 4RTU3, associated contacts in the right terminal unit tree network 163 are reversed from a condition, as shown in FIG. 10, thereby establishing a circuit path representative of the selected unit digit 5 of the selected right terminal lamp 112 in the lamp circuit 161. The established circuit path in the tree network 163 includes the closed contacts 10RTU1(3), 10RTU3(3) and the normally closed contact 10RTU2(6). As the circuit path is established in the tree network 163, an illuminating path for the selected lamp 112. designated by the number 05, is completed and includes the previously selected circuit path in the right terminal decade tree network 159, the selected lamp 112 of the lamp circuit 161 and the selected circuit path in the right terminal unit tree network 163. Upon operation of the stop relay 3S at the completion of the selection cycle, the contact 10S(6) is closed, whereby illuminating potential is applied to the selected lamp 112, designated by the number 05.

Further, as the selector relays 4RTU1 and 4RTU3 are operated, associated contacts 3RTU1(4) and 3RTU3(8), respectively, are closed to condition the transfer relay 3T8 for operation when the contact 3P(6) is closed. As the character reading cycle is completed, the tape 187 is moved, whereby causing the sensing fingers 183*a*, 183*c* and 183*f* disengage from the ground bar 188. As the finger 183*f* disengages from the ground bar 188, the relay 3P is rendered inoperative and the contacts 3P(1–5) are opened to disconnect the tape reader 138 from the distribution network 139. In addition, the contact 3P(6) is closed, whereby the transfer relay 3T8 is connected to ground and is operated. Upon operation of the transfer relay 3T8, the locking contact 3T8(1) is closed to connect the relay to ground through the normally closed reset contact 3R(2). In addition, the normally open contact 3T8(2) is closed.

Upon operation of the transfer relay 3T8, associated contacts 3T8(3–7) are opened to disconnect the relays of the relay circuit 162 from the distribution network 139. However, the relays 4RTU1 and 4RTU3 are retained in the operate state because the relays are connected to ground through the locking circuit which includes closed contacts 4RTU1(1) and 4RTU3(1), respectively, and normally closed, reset contact 3R(2).

DETAILED WIRE LENGTH SELECTION

As the transfer relay 3T8 is operated, the normally open associated contacts 3T8(8–11) are closed to connect the relays of the wire length decade relay circuit 164 to the distribution network 139.

Subsequently, the tape 187 presents the next character to the tape reader 138 and the sensing finger 183*f* engages the ground bar, whereby the relay 3P is connected to ground and is operated thereby. As the relay 3P is operated, contacts 3P(1–5) are closed to connect the tape reader 138 to the distribution network 139. In addition, the contact 3P(6) is opened to prevent the connecting of ground to the relays of the transfer network 171 during the period when the selector relays of the relay circuit 164 are being selected.

Assuming that the digit 2 is the selected wire length decade digit, the sensing finger 183*b* senses one of the apertures 186 in the punched tape 187 and engages the ground bar 188 simultaneously with the finger 183*f*, whereby ground is connected to the selector relay 3WLD2 through a circuit path which includes the closed contact 3T8(9), the normally closed contacts 3T9(4) and the closed contact 3P(2). Since the opposite side of the selector relay 3WLD2 is connected to the positive potential, the relay is operated, whereby the locking contact 3WLD2(1) connects the relay to ground through the normally closed reset contact 3R(2). In this manner, the selector relay 3WLD2 is retained in the operate state subsequent to removal of ground through the tape reader 138 and the distribution network 139.

As the selector relay 3WLD2 is operated, associated contacts in the wire length decade tree network 166 are reversed from the condition shown in FIG. 11. In this manner, a circuit path is established for selecting the portion of the lamp circuit 167 associated with the decade digit 2. The selected circuit path includes the normally closed contact 11WLD1(2) and the closed contact 11WLD2(3).

Further, as the selector relay 3WLD2 is operated, the associated contact 3WLD2(6) is closed to condition the transfer relay 3T9 for operation upon the closing of the contact 3P(6). Subsequently, as the tape 187 moves upon completion of the character reading cycle, the sensing fingers 183*b* and 183*f* are disengaged from the ground bar 188, whereby the relay 3P is rendered inoperative. As the operating potential is removed from the relay 3P, the contacts 3P(1–5) are opened to disconnect the tape reader 138 from the distribution network 139. Further, the contact 3P(6) is closed, whereby the transfer relay 3T9 is connected to ground and the relay is operated.

As the transfer relay 3T9 is operated, the associated locking contact 3T9(1) is closed to connect the relay to ground through the normally closed reset contact 3R(2), whereby the relay is retained in the operate state subsequent to the opening of the contact 3WLD2(6). In addition, the normally open transfer contact 3T9(2) is closed.

Further, upon operation of the transfer relay 3T9, normally closed associated transfer contacts 3T9(3–7) are opened, thereby disconnecting the relays of the relay circuit 164 from the distribution network 139. However, the selector relay 3WLD2 remains in the operate state because the relay is connected to ground through the locking circuit which includes the closed contact 3WLD2(1) and the normally closed, reset contact 3R(2). In addition, the normally open associated transfer contacts 3T9(8–12) are closed to connect the relays of the wire length unit relay circuit 168 to the distribution network 139.

Thereafter, another character reading cycle is initiated, whereby the sensing finger 183*f* senses one of the apertures 186 and engages the ground bar 188. As the finger 183*f* engages the ground bar 188, the relay 3P is operated and the contacts 3P(1–5) are closed to connect the tape reader 138 to the distribution network 139. In addition, the contact 3P(6) is opened to prevent the relays of the transfer network 171 from being connected to ground during the period when the selector relays of the relay circuit 168 are being selected.

Assuming that the digit 8 is the selected wire length unit digit, the sensing finger 183*d* senses one of the apertures 186 of the punched tape 187 and engages the ground bar 188 simultaneously with the finger 183*f*, whereby ground is connected to the selector relay 3WLU4 through a circuit path which includes closed contact 3T9(11), the normally closed contact 3T10(6) and the closed contact 3P(4). Since the opposite side of the selector relay 3WLU4 is connected to the positive potential, the relay is operated, whereby the associated locking contact 3WLU4(1) is closed to connect the relay to ground through the normally closed reset contact 3R(2). In this manner, the relay 3WLU4 is retained in the operate state subsequent to the removal of ground through the tape reader 138 and the distribution network 139.

As the selector relay 3WLU4 is operated, associated contacts in the wire length unit tree network 169 are reversed from the condition shown in FIG. 11, whereby a circuit path is established representative of the selected unit digit 8. The selected circuit path includes the normally closed contacts 11WLU1(2), 11WLU2(2) and 11WLU3(4) and the closed contact 11WLU4(3). Thus, the selected circuit path for illuminating the indicating lamp 137 of the wire selector indicator includes the selected circuit path of the wire length decade tree network 166, the selected lamp 137, designated number 28, of the lamp circuit 167 and the selected circuit path of the wire length unit tree network 169. Upon operation of the stop relay 3S and the completion of the selection cycle, the contact 11S(7) closes, whereby illuminating potential is applied to the selected lamp 137, designated by the number 28.

Further, upon operation of the selector relay 3WLU4, the associated contact 3WLU4(6) is closed to condition the transfer relay 3T10 for operation when the contact 3P(6) is closed. Upon completion of the character reading cycle the tape 187 advances and the sensing fingers 183*d* and 183*f* are disengaged from the ground bar 188, whereby the relay 3P is rendered inoperative. As the relay 3P is rendered inoperative, the contacts 3P(1–5) are opened to disconnect the tape reader 138 from the distribution network 139. In addition, the contact 3P(6) is closed, whereby the transfer relay 3T10 is connected to ground and is operated thereby. As the relay 3T10 is operated, the associated locking contact 3T10(1) is closed to connect the relay to ground through the normally closed reset contact 3R(2).

In addition, the operation of the transfer relay 3T10 opens the normally closed transfer contacts 3T10(3–7) which disconnects the relays of the relay circuit 168 from the distribution network 139. However, the selector relay 3WLU4 remains in the operate state because the relay is connected to ground through the locking circuit which includes the closed contact 3WLU4(1) and the normally closed, reset contact 3R(2).

Further, operation of the relay 3T10 closes the associated transfer contact 3T10(2) which is connected in series with the previously closed contacts 3T1(2) through 3T9(2), whereby the stop relay 3S is connected to ground through the normally closed, reset contact 3R(2). Since the opposite side of the relay 3S is connected to the positive potential, the relay is operated, whereby the associated locking contact 3S(2) is closed to connect the relay to ground through the normally closed reset contact 3R(2). In this manner, the stop relay 3S remains in the operate state regardless of the subsequent condition of the transfer contacts 3T1(2) through 3T10(2).

Upon operation of the stop relay 3S, the associated contact 3S(1) is opened, whereby the operating potential is removed from the tape reader motor 191 and the tape reader 138 ceases to operate. It is noted that the tape reader 138 is not stopped until ten legitimate characters have been read to provide instructions to the ten separate relay circuits for selecting the five indicator lamps 112 and 137 indicative of the selected terminals 111 and the selected wire 131 to be connected between the terminals.

As the stop relay 4S is operated, the associated contacts 6S(3), 8S(4), 9S(5), 10S(6) and 11S(7) are closed, whereby illuminating potential is applied to the selected connector and terminal lamps 112 and the selected wire length lamp 137.

Subsequently, the wireman selects one of the wires 131 from the designated receptacle 129 and thereafter connects the selected wire between the designated terminals 111. Upon completion of the proper connection, the continuity detector 178 responds to the completion of the selected wiring by illuminating the green lamp 118 and removing illuminating potential from the red lamp 119. In addition, the detector relay 16D is operated to close detector contact 3D(1) which is connected in series with the reset relay 3R and the normally open advance switch 193. Thereafter, the wireman momentarily closes the advance switch 193, whereby operating potential is applied to the reset relay 3R to operate the relay. Upon operation of the reset relay 3R, the normally closed contact 3R(1) is opened to prevent operation of the tape reader 138 during the period when the surface wiring assist device is being reset in preparation for another indicating selection cycle.

As the relay 3R is operated, the normally closed reset contact 3R(2) is opened and ground is disconnected from the various locking circuits of the relay selector circuits and the transfer relays 3T1 through 3T10. Hence, all of the relays which were previously locked in the operate state are now released and the associated contacts revert to the normal condition shown in the figures. When the wireman releases the advance switch 193, operating potential is removed from the reset relay 3R and the associated contacts 3R(1) and 3R(2) are closed, whereby operating potential is applied to the reader motor 191. In this manner, the surface wiring assist device is prepared for the next indicating selection cycle and the tape reader 138 advance the tape 187 for a new character reading cycle.

It is noted that if the advance switch 193 is not included in the circuit, and the detector relay 16D is a delay type relay which holds the associated detector contacts in the operate state only for a delayed period, the reset relay 3R can be automatically operated upon the operation of the detector relay 16D which results in the closure of the associated contact 3D(1). In this manner, the reset cycle is automatic upon the completion of a successful wiring procedure, whereby reset contacts 3R(1) and 3R(2) are opened to preclude operation of the reader motor 191 and further, to release the locking circuits of the various locked relays in the relay selector circuits and the transfer network. Further, the red lamp 119 and the green lamp 118 will be controlled in the same manner as previously discussed.

After a delayed period, the detector relay 16D releases the associated contacts whereby the contacts 3D(1) is opened to remove the operating potential from the reset relay 3R. As the operating potential is removed from the reset relay 3R, the contacts 3R(1) and 3R(2) revert to the normally closed state to initiate operation of the reader motor 191 and to further prepare the locking circuits for the various relays of the selector circuits and the transfer network 171.

DETAILED CONTINUITY DETECTOR OPERATION

Figure 16:
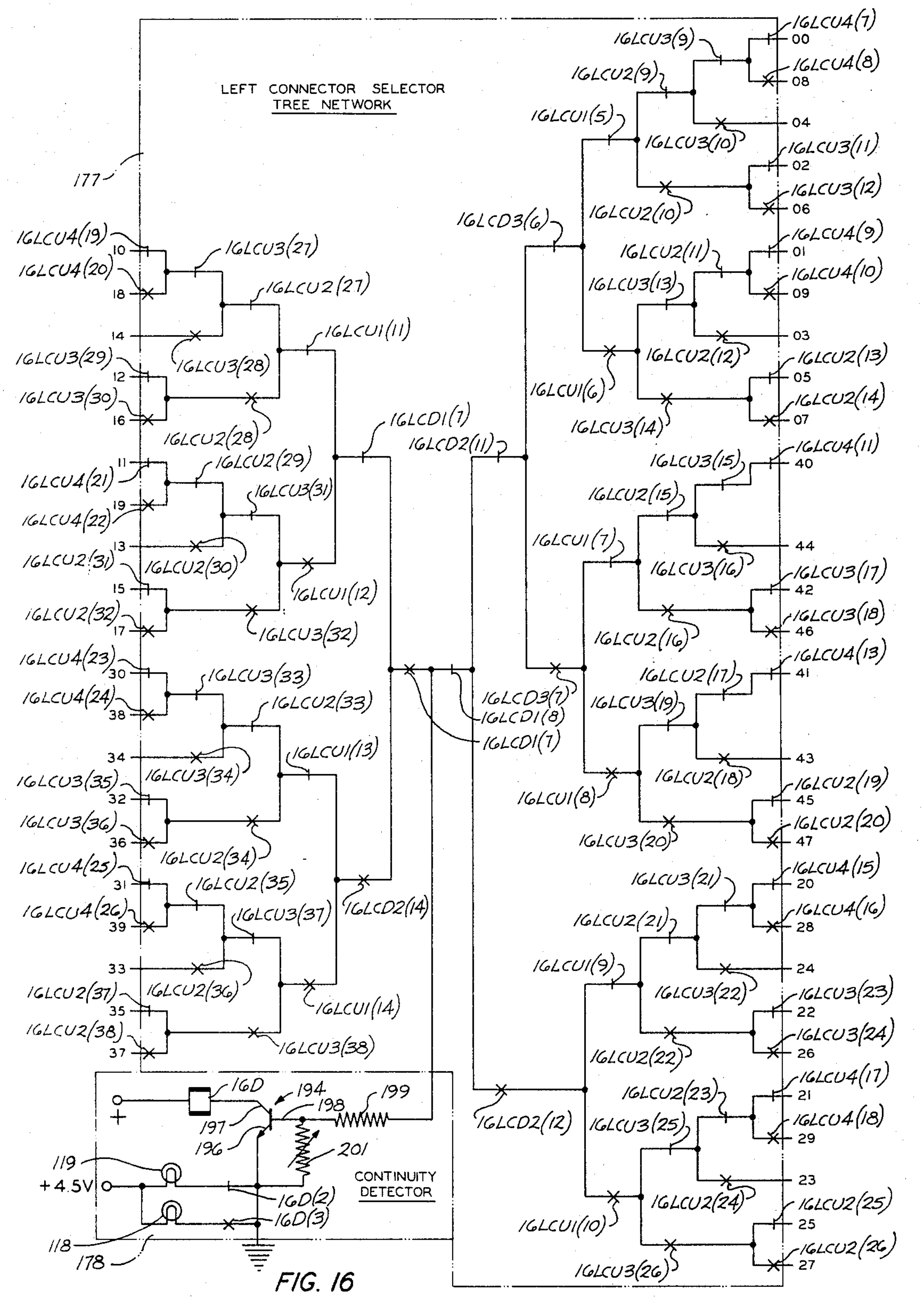

As shown in FIG. 16, the continuity detector 178 is provided with a NPN type transistor 194 having an emitter 196 connected to ground, a collector 197 connected to the positive potential through the detector relay 16D and a base 198 connected to the single input line of the left connector selector tree network 177 through a current limiting resistor 199. In addition, a variable bias resistor 201 is connected between the emitter 196 and the base 198. Since there is no complete circuit path through the resistors 199 and 201, there is no potential appearing across the biasing resistor 201. Hence, the emitter 196 and the base 198 are essentially at ground potential and the transistor is in the nonconductive state.

Also included in the continuity detector 178 is the red lamp connected in series with a normally closed detector contact 16D(2) between ground and the 4.5 volt positive potential. In this manner, the red lamp 119 is normally illuminated when the detector relay 16D is in the inoperate state. Further, the green lamp 118 is included in the continuity detector 178 and is connected in series with a normally open detector contact 16D(3) between ground and the 4.5 volt positive potential.

As further shown in FIG. 16, the left connector selector tree network 177 includes a plurality of contacts associated with and controlled by the selector relays of the left connector decade and left connector unit relay circuits 141 and 144, respectively. Upon the operation of selected relays in the selector relay circuits 141 and 144, associated contacts of the operated relays establish a circuit path between the single input line of the tree network 177 and one of 48 output lines of the tree network which appear along the vertical perimeters of the tree network and are designated 00–47.

Figure 17:
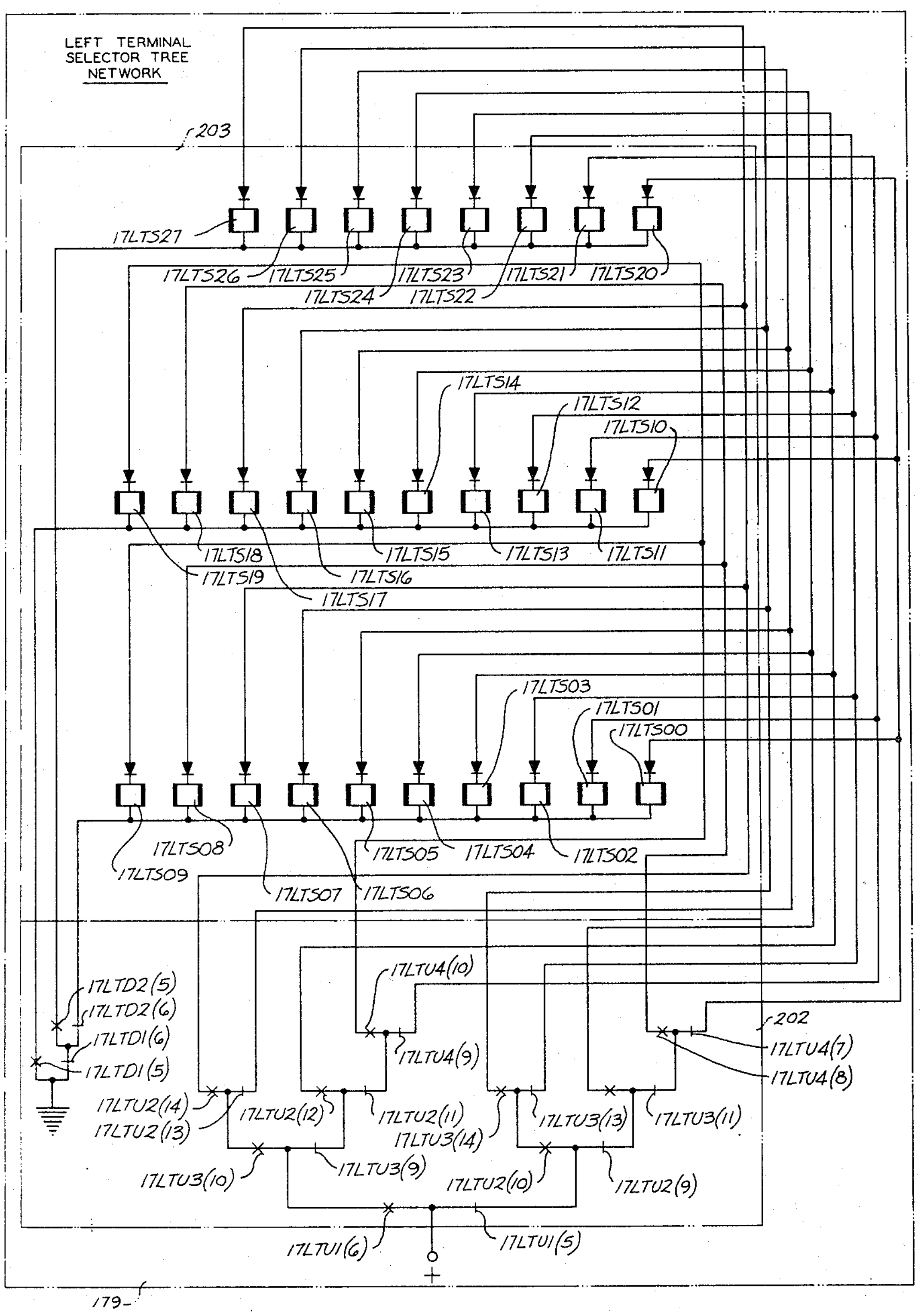

As shown in FIG. 17, the left terminal selector tree network 179 includes a tree circuit 202 having contacts controlled by the left terminal decade and left unit relay circuits 147 and 151, respectively. The contacts of the tree circuit 202 establish a circuit path for the selection of one of twenty-eight left terminal selector relays 17LTS00 through 17LTS27 of a left terminal selector relay circuit 203.

Figure 18:
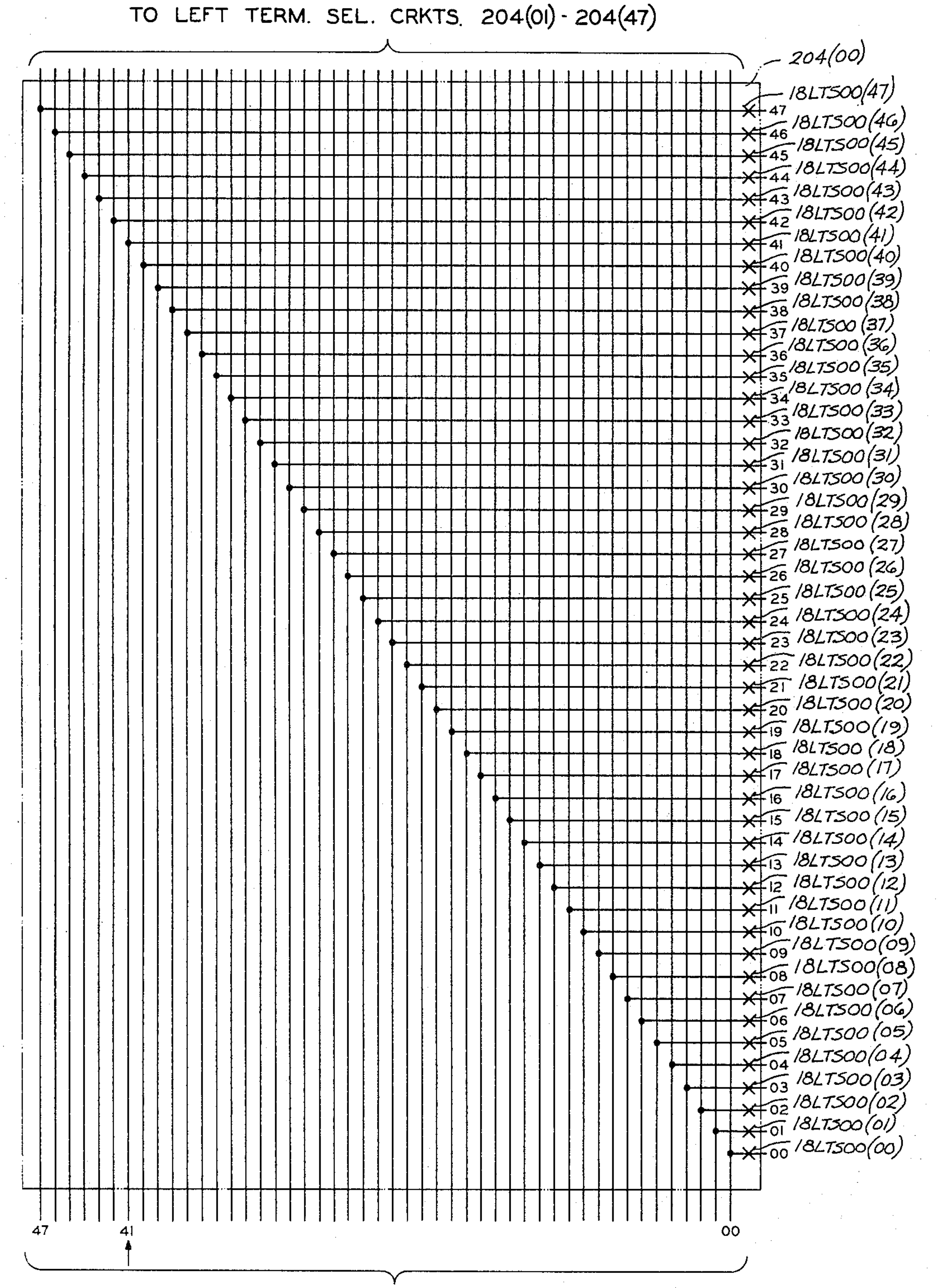

As shown in FIG. 18, the left terminal selector tree network 179 also includes 28 circuits identical to a left terminal selector circuit which, for the purposes of illustration, is designated by the number 204(00). The terminal selector circuit, as shown in FIG. 18, is designated by the number 204(00) and refers to a first of the 28 identical circuits which are numbered 204(00) through 204(27). Further, each of the twenty-eight circuits 204(00) through 204(27) is provided with 48 input lines, numbered 00–47, which are commonly connected to the forty-eight output lines (00–47) of the left connector selector tree network 177. In addition, each of the terminal selector circuits 204(00) through 204(27) is provided with forty-eight output lines, also numbered 00–47, each of which is connected respectively to the forty-eight selector circuit input lines 00–47 connected to the forty-eight output lines of the tree network 177. It is noted that the forty-eight output lines of the tree network 179 and the forty-eight output lines of each selector circuit 204(00) through 204(27) ar enumbered 00 through 47, respectively, to correlate the commonly connected lines of the tree networks and the selector circuits. For example, the output line 41 of the tree network 177 is connected to the input line 41 of the tree network 179 which is further connected to the output lines 41 of the respective selector circuits 204(00) through 204(27).

The forty-eight output lines (00–47) of each terminal selector circuit 204(00) through 204(27) are provided with normally open left terminal selector contacts, which are controlled by the respective relays 17LTS00 through 17LTS27, wherein the forty-eight contacts of the circuit 204(00) are numbered, for the purposes of illustration, 18LTS00(00) through 18LTS00(47). This numbering pattern is continued for the remaining selector circuits 204(01) through 204(27) where the forty-eight contacts of the circuit 204(27) are numbered 18LTS27(00) through 18LTS27(47).

Circuit connections (not shown) are provided on the rear face of the connectors 110 which are common with the 1344 terminals 111 extending from the front face of the connectors. The forty-eight output lines (00–47) of each of the left terminal selector circuits 204(00) through 204(27) are connected to the respective rear circuit connections of the twenty-eight horizontally disposed rows of terminals 111 extending from the forty-eight vertically aligned connectors 110. For example, the forty-eight output lines extending from the terminal selector circuit 204(00) are connected to the respective rear circuit connections of the row of forty-eight horizontally disposed terminals 111 extending between left and right terminal lamps 112 designated by the number 00. Further, the forty-eight output lines of the terminal selector circuit 204(27) are connected to the circuit connections of the row of horizontally disposed terminals 111 extending between the left and right terminal lamps 112, designated by the number 27.

Figure 19:
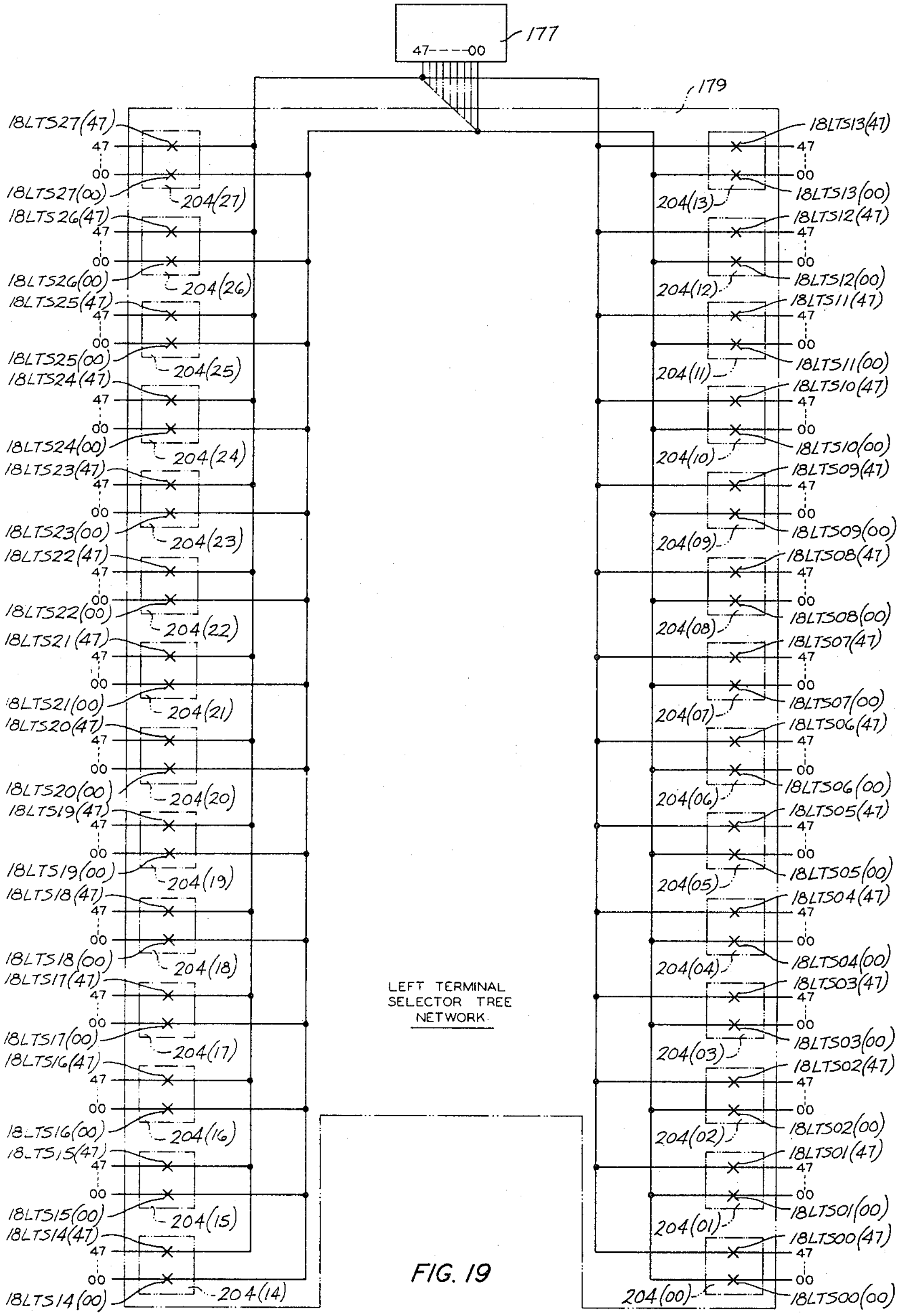

As shown in FIG. 19, the forty-eight output lines of the left connector selector tree network 177 are commonly connected to the twenty-eight left terminal selector circuits 204(00) through 204(27). For the purposes of illustration, since the contacts 18LTS00(00–47) through 18LTS27(00–47) are designated as such in FIG. 18, the same contacts which also appear in FIG. 19 will retain the same designation. For example, as shown in FIG. 19, the extreme contacts shown within the selector circuit 204(00) are designated 18LTS00(00) and 18LTS00(47) respectively.

Figure 20:
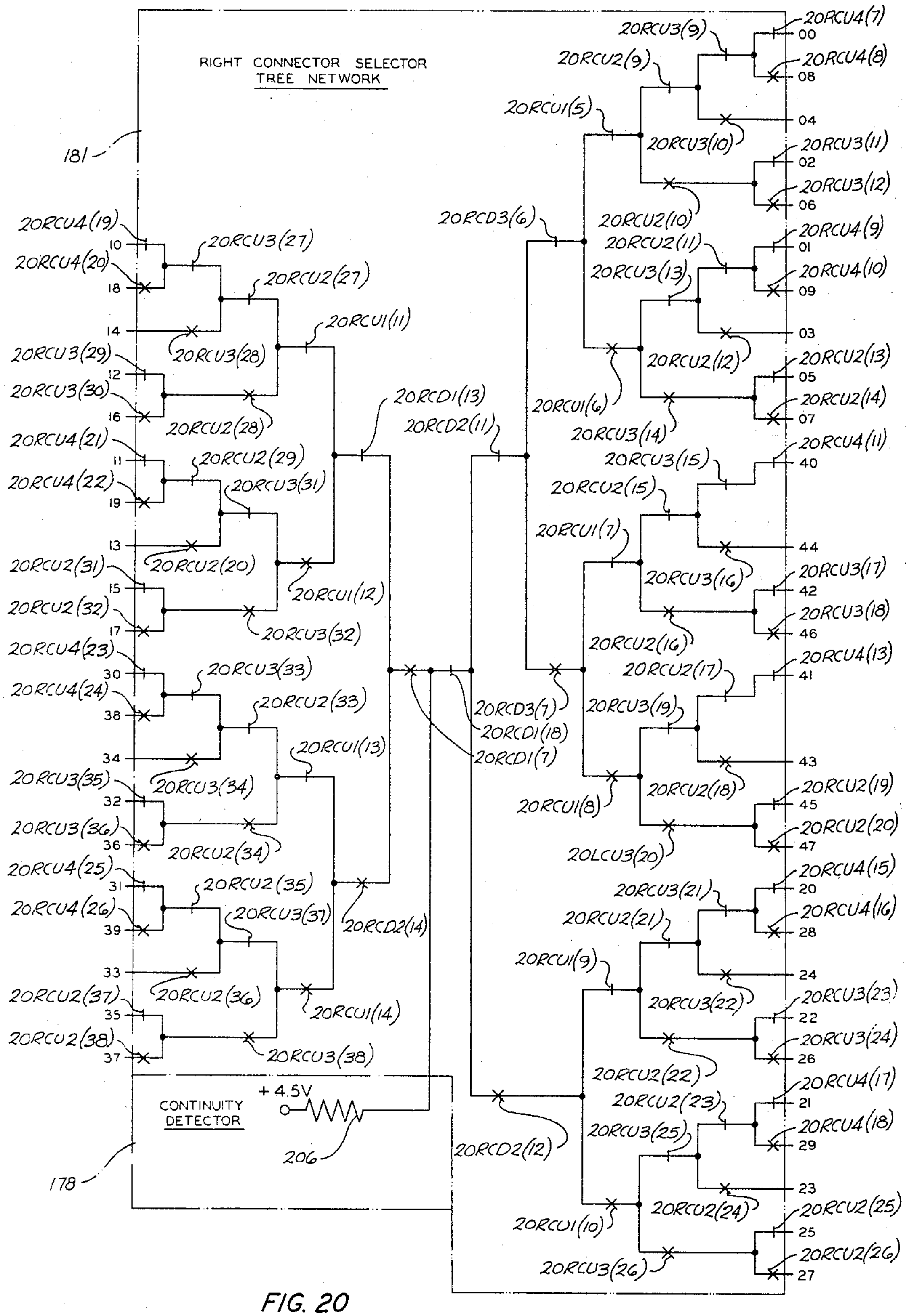

As shown in FIG. 20, the right connector selector tree network 181 includes a plurality of contacts which are controlled by the selector relays of the right connector decade and right connector unit relay circuits 153 and 156, respectively. The tree network 181 is provided with a single input line and 48 output lines which appear along along the vertical perimeters of the tree network and are designated 00–47. The single input line is connected to the 4.5 volt positive potential through a current limiting resistor 206 which is connected within the continuity detector 178. Upon selective operation of the relays in the right connector decade and right connector unit relay circuits 153 and 156, a circuit path is established between the single input line of the tree network 181 and one of the forty-eight output lines (00–47) of the tree network. It is noted that the arrangement of the relay contacts in the right connector selector tree nework 181 is identical to the arrangement of the contacts of the left connector selector tree network 177.

Figure 21:
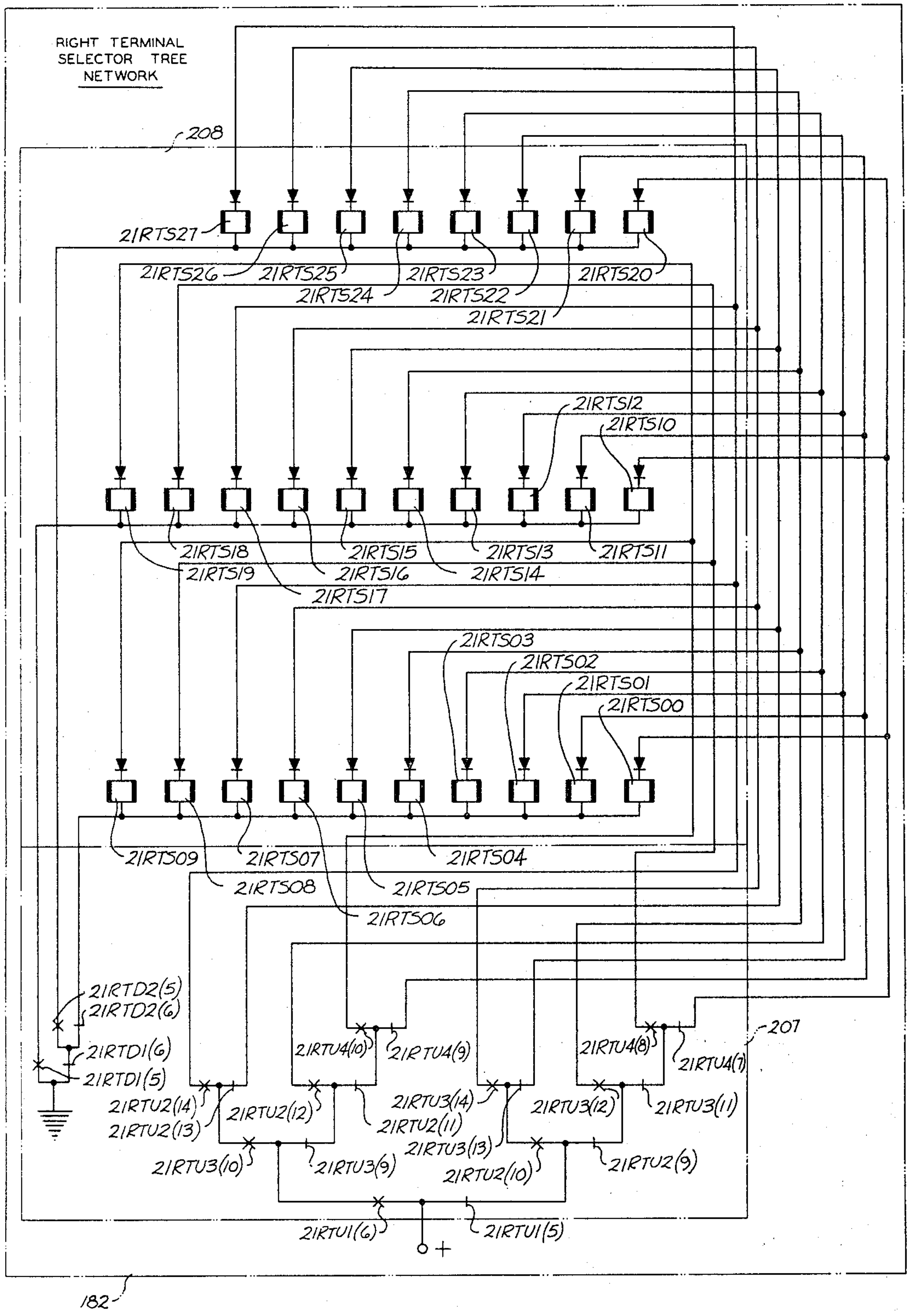

As shown in FIG. 21, the right terminal selector tree network 182 includes a tree circuit 207 having contacts controlled by the right terminal decade and right terminal unit relay circuits 158 and 162, respectively, for establishing a circuit path for the selection of one of twenty-eight right terminal selector relays 21RTS00 through 21RTS27 of a right terminal selector relay circuit 208.

Figure 22:
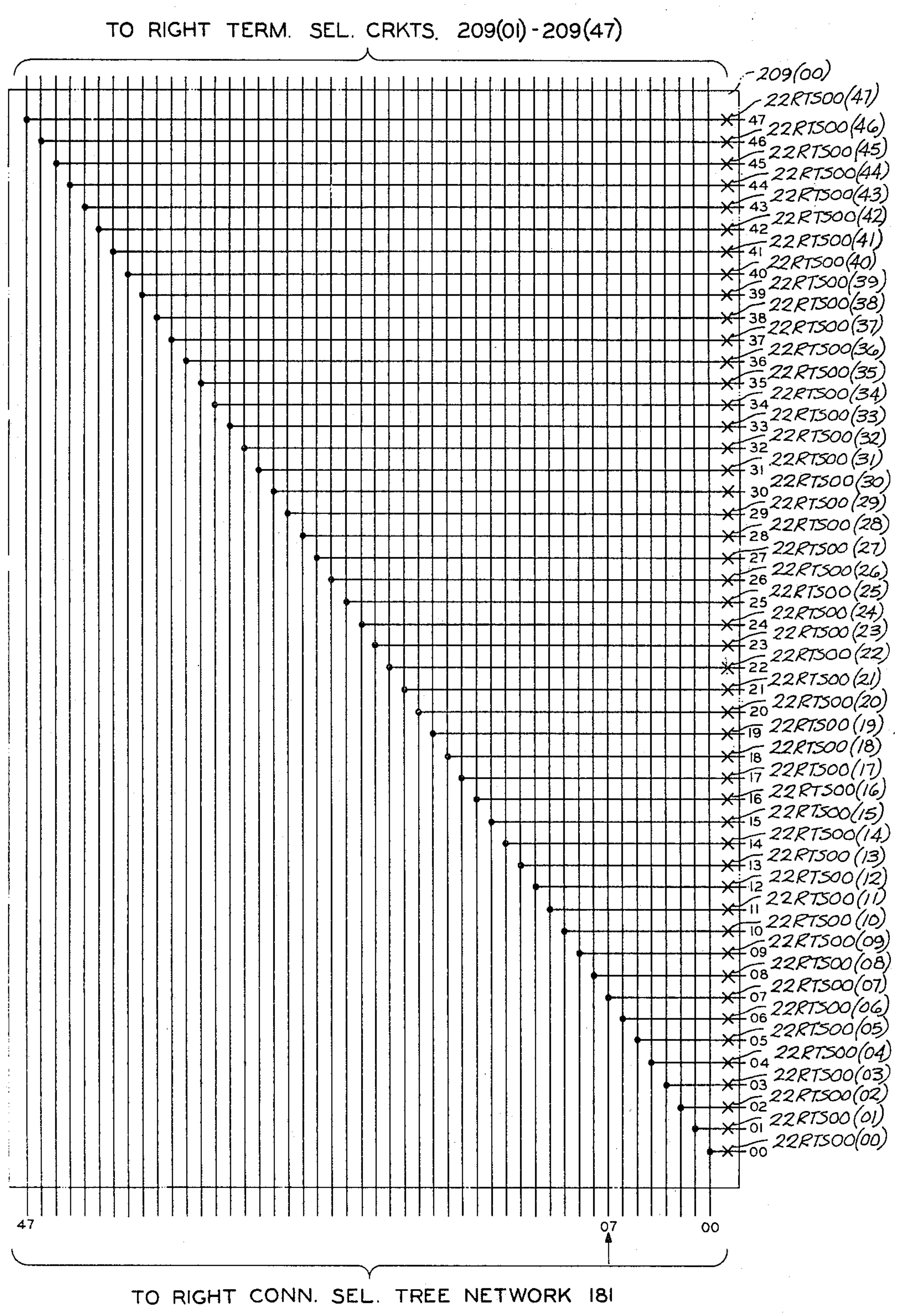

The right terminal selector tree network 182 also includes twenty-eight terminal selector circuits identical to a right terminal selector circuit shown in FIG. 22 which, for the purposes of illustration, is designated by the number 209(00). The terminal selector circuit 209(00), as shown in FIG. 22, refers to a first of the twenty-eight identical circuits which are numbered 209(00) through 209(27). Each of the twenty-eight circuits 209(00) through 209(27) is provided with forty-eight input lines (00–47) which are commonly connected to the forty-eight output lines (00–47) of the right connector selector tree network 181. In addition, each of the terminal selector circuits 209(00) through 209(27) is provided with forty-eight output lines (00–47), each of which is connected respectively to the forty-eight selector circuit input lines (00–47).

The forty-eight output lines (00–47) of each of the terminal selector circuits 209(00) through 209(27) are provided with normally open, right terminal selector contacts, which are controlled by the relays 21RTS00 through 21RTS27, wherein the forty-eight contacts of the circuit 209(00) are numbered, for the purposes of illustration, 22RTS00(00) through 22RTS00(47). It is noted that this designation, as shown in FIG. 22, applies to the terminals associated with the terminal selector circuit 209(00) and, for example, the contact designation for the selector circuit 209(27) would appear as 22RTS27(00) through 22RTS27(47).

As previously mentioned, circuit connections (not shown) are provided on the rear face of the connectors 110 which are common with the 1344 terminals 111 extending from the front face of the connectors. The forty-eight output lines of each of the right terminal selector circuits 209(00) through 209(27) are connected to the respective rear circuit connections of the twenty-eight, horizontally disposed rows of terminals 111 extending from the forty-eight vertically aligned connectors 110. For example, the forty-eight output lines extending from the terminal selector circuit 209(00) are connected to the respective rear circuit connections of the horizontally disposed row of forty-eight terminals 111 extending between the left and right terminal lamps 112, designated by the number 00. Further, the forty-eight output lines of the terminal selector circuit 209(27) are connected to the respective rear circuit connections of the horizontally disposed row of forty-eight terminals 111 extending between the left and right terminal lamps 112, designated by the number 27.

Figure 23:
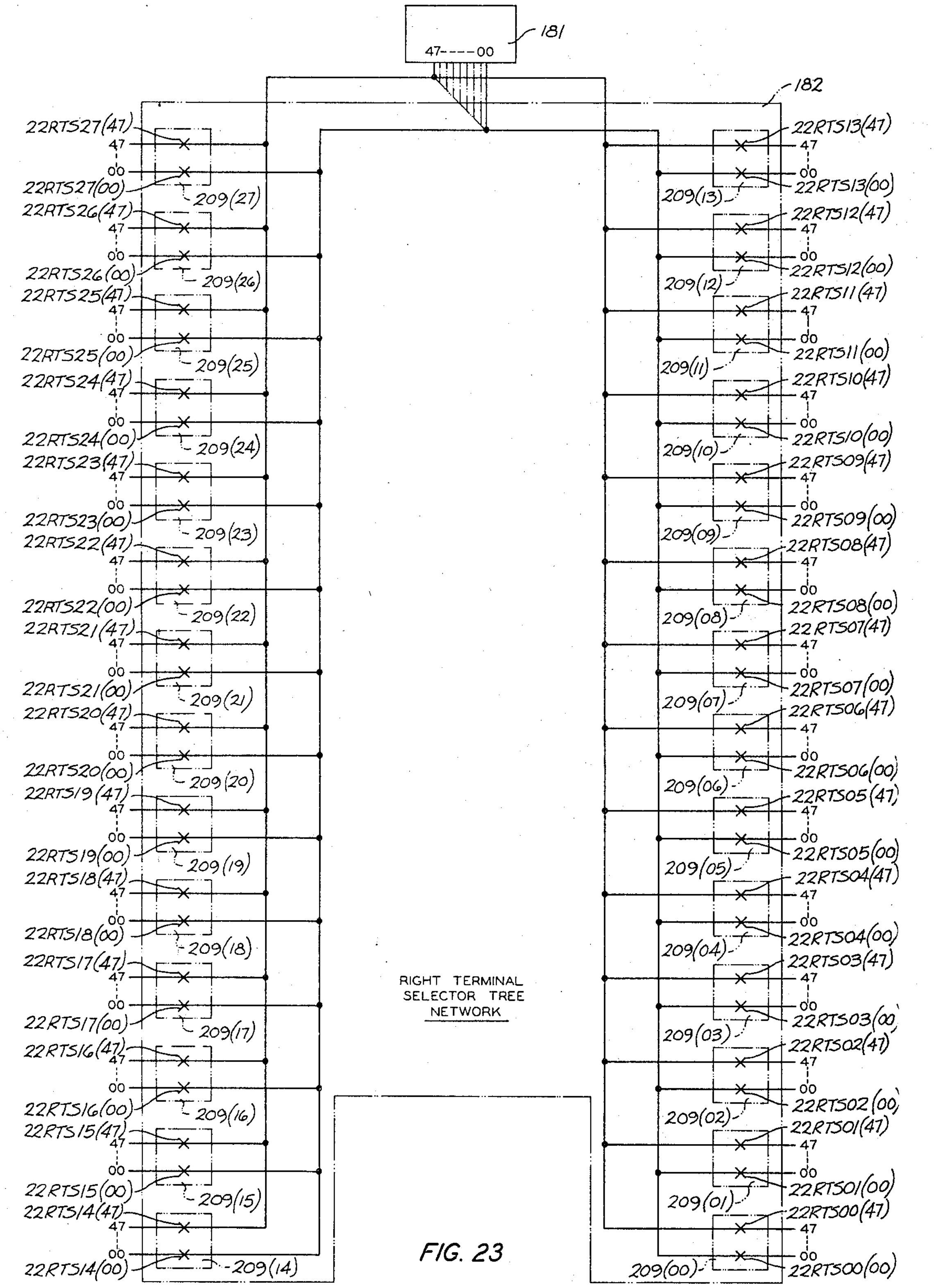

As shown in FIG. 23, the 48 output lines (00–47) of the right connector selector tree network 181 is commonly connected to the twenty-eight terminal selector circuits 209(00) through 209(27). For the purposes of illustration, since the contacts 22RTS00(00–47) through 22RTS27(00–47) are designated as such in FIG. 22, the contacts, which also appear in FIG. 23 will retain the same designation. For example, as shown in FIG. 23, the extreme contacts shown within the selector circuit 209(00) are designated 22RTS00(00) and 22RTS00(47), respectively.

For the purpose of explaining the operation of the continuity detector 178 and the associated tree networks, the previously selected left and right connector digits and the previously selected left and right terminal digits will also be used in this example.

In the selection of the left connector digit 41, the selector relay 5LCD3 of the left connector decade relay circuit 141 and the selector relay 5LCU1 of the left connector unit relay circuit 144 are separately operated as previously mentioned, whereby associated contacts in the left connector selector tree network 177 are reversed from the condition shown in FIG. 16. In this manner, a circuit path is established in the tree network 177 for connecting one side of the continuity detector 178 to the output line 41 of the tree network. The circuit path includes normally closed contacts 16LCD1(8) and 16LCD2(11), closed contacts 16LCD3(7) and 16LCU1(8), and normally closed contacts 16LCU3(19), 16LCU2(17) and 16LCU4(13). It is noted that the circuit path established in the tree network 177 connects the input line of the tree network to the output line 41 which corresponds by number to the selected left connector digit 41 and is, therefore, representative of the selected left connector 110.

As previously discussed, the selector relay 5LTD2 in the left terminal decade relay circuit 147 and the selector relays 5LTU1 and 5LTU2 in the left terminal unit relay circuit 151 are separately operated in the selection of the left terminal digit 23. As these relays are operated, associated contacts in the tree circuit 202 of the left terminal selector tree network 179 are reversed from a condition as shown in FIG. 17, whereby a circuit path is established to provide operating potential to the left terminal selector relay 17LTS23 in the left terminal selector relay circuit 203. A portion of the established circuit path, which is controlled by the selector relay 5LTD2, includes the normally closed contacts 17LTD1(6) and the closed contact 17LTD2(5), which facilitates the connection of ground to one side of the selector relays 17LST20 through 17LST27. In addition, the remaining portion of the established circuit path, which is controlled by the selector relays 5LTU1 and 5LTU2, includes the closed contact 17LTU1(6), the normally closed contact 17LTU3(9) and the closed contact 17LTU2(12), which connects the positive potential to the opposite side of the selector relay 17LTS23, thereby operating the relay.

Referring to FIG. 18, the 48 input lines 00–47 of the left terminal selector circuit 204(23) is connected to the correspondingly numbered output lines of the tree network 177. Upon operation of the left terminal selector relay 17LTS23, the 48 associated contacts 18LTS23(00) through 18LTS23(47) are closed, thereby connecting the 48 input lines 00–47 of the left terminal selector circuit 204(23) to the corresponding 48 output lines 00–47 of the same selector circuit.

Since the input line designated number 41 of the left terminal selector circuit 204(23) is connected through the selected circuit path in the left connector selector tree network 177, as shown in FIG. 16, a circuit path is completed from the continuity detector 178 to the terminal **111*a*, which is connected to the output line designated number 41 of the selector circuit 204(23)**.

Referring to FIG. 20, the right connector selector tree network 181 is provided with contacts controlled by the right connector decade and right connector unit relay circuits 153 and 156, respectively. In the selection of the right connector number 07, the selector relay 4RCD4 is operated in the right connector decade relay circuit 153 to indicate the selection of the decade digit 0. Since the operation of the selector relay 4RCD4 only controls contacts in the transfer network 171, the contacts in the right connector selector tree network 181, which are controlled by the relay circuit 153, remain in the normal state, as shown in FIG. 20.

Subsequently, selector relays 4RCU1, 4RCU2 and 4RCU3 are operated in the relay circuit 156 to complete a circuit path in the tree network 157 representative of the selected right connector unit digit 7. In addition, associated contacts in the tree network 181 are also reversed from the state as shown in FIG. 20, whereby a circuit path is established between the continuity detector 178 and the output line designated number 07 of the tree network 181. The established circuit path includes the normally closed contacts 20RCD1(8), 20RCD2(11), 20RCD3(6), closed contacts 20RCU1(6), 20RCU3(14) and 20RCU2(14).

Thereafter, selector relays in the right terminal decade and right terminal unit relay circuits 158 and 162, respectively, are operated to select the right terminal digit 05. The selector relay 4RTD3 is operated in the relay circuit 158 to indicate the selection of the right terminal decade digit 0. Since the selector relay 4RTD3 does not have contacts in the tree circuit 207, the contacts of the decade portion of the tree circuit 207 remain in the normal state, as shown in FIG. 20, whereby a circuit path is established between ground and a common side of the relays 21RTS00 through 21RTS09, through the normally closed contacts 21RTD1(6) and 21RTD2(6).

Subsequently, the selector relays 4RTU1 and 4RTU3 are operated to indicate the selection of the right terminal unit digit 5, whereby contacts associated with these relays which appear in the tree circuit 207 are reversed from the normal state shown in FIG. 21. Upon the operation of the selector relays 4RTU1 and 4RTU3, a circuit path is established between the positive potential and the relay 21RTS05, which includes the closed contacts 21RTU1(6) and 21RTU3(10) and normally closed contact 21RTU2(12). Since the relay 21RTS05 is now connected between the positive potential and ground, the relay is operated, thereby closing the associated contacts 22RT05(00) through 22RTS05(47) which appear in the right terminal selector circuit 209(05).

As the contacts 22RTS05(00–47) are closed, a circuit path is completed through the selector circuit 209(05) which includes the input line designated number 07, the closed contacts 22RTS05(07) and the output line designated 07 which is connected to the selected terminal **111*b*. Hence, a selected circuit path is completed between the positive potential in the continuity detector 178 (FIG. 20) and the selected terminal 111*b*, which includes the current limiting resistor 206 (FIG. 20), the circuit path of the tree network 181 (FIG. 20), and the circuit path of the selector circuit 209(05) (FIG. 23). Hence, a circuit path is now established between ground in the continuity detector 178 (FIG. 16) and the selected terminal 111*a*, and further between the positive potential in the continuity detector 178 (FIG. 20) and the selected terminal 111*b***.

Referring to FIG. 16, the red lamp 119 is illuminated, as previously discussed, by the application of illuminating potential through a circuit path which includes the normally closed contact 16D(2). When the selected wire 131 is connected between the selected terminals **111*a* and 111*b*, a complete circuit path is established between ground (FIG. 16) and the positive potential (FIG. 20), which includes the biasing resistor 201, the current limiting resistor 199, the established circuit paths of the tree networks 177, 179, 181 and 182, the selected terminals 111*a* and 111*b*, the selected wire 131, and the resistor 206. As the selected circuit path is established, a current flow results, whereby a biasing potential is developed across the biasing resistor 201 to develop an operating bias between the emitter 196 and the base 198 of the transistor 194** to switch the transistor to the operate state, whereby a current flow results between the emitter and the collector of the transistor.

The switching of the transistor 194 into the operate state results in the connection of the detector relay 16D between ground and the positive potential through the collector-emitter circuit of the transistor, whereby the relay is operated. As the relay 16D is operated, the associated contact 16D(2) is opened to remove the illuminating potential from the red lamp 119. In addition, the associated contact 16D(3) is closed, whereby illuminating potential is applied to the green lamp 118 and the lamp is illuminated. In this manner, visual indication is provided for the wireman to indicate the completion of surface wiring between the selected terminals **111*a* and 111*b***.

Further, as previously discussed, the detector contact 3D(1) is closed to condition the circuit path of the reset relay 3R for subsequent operation of the relay when the wireman closes the advance switch 193. It is noted that if the advance switch 193 is not included in the circuit, the reset relay 3R will operate automatically when the detector relay 16D operates to indicate the completion of the desired wiring procedure. If a delay type relay is used for the detector relay 16D, the reset cycle will be timed to provide a sufficient period for the wireman to analyze the completion of the wiring procedure.

Thus, by utilization of a surface wiring assist device which visually designates terminals 111 to be connected by surface wiring, and further visually indicates the selection of a proper length of the wire 131 to be connected between the selected terminals, considerable time-consuming efforts are obviated in preparing lengthy instruction lists and in reading such instruction lists by the wireman. Further, the cooperation of the continuity detector 178 in the wiring procedure visually notifies the wireman of the proper connection between the selected terminals 111, thereby obviating the necessity of subsequent time-consuming tests on a completely surface-wired assembly.

What is claimed is:

1. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals, which comprises:

a row of indicators positioned adjacent the group of terminals so that each column of the terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that the terminal to be selected is aligned with one of the selected indicators of the row of indicators and one of the selected indicators of either the first or second column of indicators, a wire supply formed with receptacles for receiving different lengths of wires therein with each receptacle containing wires of a common length, a wire-length indicator positioned adjacent each receptacle, means for selecting five indicators which include a pair of the indicators in the row of the indicators, one indicator in each column of indicators and one wire-length indicator, means for operating the indicator-selecting means, and means for successively and separately controlling the operating means to successively and separately operate the selector means so that the five selected indicators which include the pair of indicators in the row of indicators, each selected indicator in the column of indicators and the selected wire-length indicator are successively and separately selected, whereby the selected indicator of the row of indicators closer to the first column of indicators is paired with the selected indicator of the first column to indicate the first selected terminal, the selected indicator of the row of indicators closer to the second column of indicators is paired with the selected indicator of the second column to indicate the second selected terminal, and the selected wire-length indicator indicates which receptacle the wire is to be selected from for proper length connection between the pair of selected terminals.

2. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that the terminal to be selected is aligned with one of the selected indicators of the row of indicators and one of the selected indicators of either the first or second column of indicators, a wire supply formed with receptacles for receiving different lengths of wires therein with each receptacle containing wires of a common length, a wire-length indicator positioned adjacent each receptacle, a plurality of circuit paths connected to the indicators, means for selecting five circuit paths connected to five indicators which include a pair of the indicators in the row of indicators, one indicator in each column of indicators and one wire-length indicator, means for operating the indicators, means for operating the circuit path selecting means to connect the indicators to the indicator-operating means, means responsive to the operation of the circuit path selecting means for successively controlling the circuit path selecting means to successively and separately operate the selecting means, whereby the five circuit paths are successively and separately selected, and means responsive to the completion of the selection of the five circuit paths for operating the indicator-operating means, whereby the selected indicator of the row of indicators closer to the first column of indicators is paired with the selected indicator of the first column to indicate the first selected terminal, the selected indicator of the row of indicators closer to the second column of indicators is paired with the selected indicator of the second column to indicate the second selected terminal, and the selected wire-length indicator indicates which receptacle the wire is to be selected from for proper length connection between the pair of selected terminals.

3. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that the terminal to be selected is aligned with one of the selected indicators of the row of indicators and one of the selected indicators of either the first or second column of indicators, a wire supply formed with receptacles for receiving different lengths of wires therein with each receptacle containing wires of a common length, a wire-length indicator positioned adjacent each receptacle, a tape having information stored therein representative of the selection of five indicators which include a pair of indicators in the row of indicators, one indicator in each of the columns of indicators and one wire-length indicator, means responsive to the information in the tape for selecting the five indicators, means for moving the tape to successively present the stored information to the selecting means so that the five indicators are successively selected, and means responsive to the successive selection of the individual indicators for conditioning the selecting means so that the selecting means is responsive to the successive presentations of information in the tape to separately and successively operate the selecting means, whereby the selected indicator of the row of indicators closer to the first column of indicators is paired with the selected indicator of the first column to indicate a first selected terminal of the pair of selected terminals, the selected indicator of the row of indicators closer to the second column of indicators is paired with the selected indicator of the second column to indicate a second selected terminal of the pair of selected terminals, and the selected wire-length indicator indicates which receptacle the wire is to be selected from for proper length connection between the pair of selected terminals.

4. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that the terminal to be selected is aligned with one of the selected indicators of the row of indicators and one of the selected indicators of either the first or second column of indicators, a wire supply formed with receptacles for receiving different lengths of wire therein with each receptacle containing wires of a common length, a wire-length indicator positioned adjacent each receptacle, a plurality of circuit paths connected to the indicators, at least five groups of relays associated with five indicators to be selected which include a pair of indicators in the row of indicators, one indicator in each column of indicators and one wire-length indicator, the relays having contacts in the circuit paths, a tape having groups of successive bits of information stored therein representative of the selection of relays in the respective groups of relays, means responsive to the information stored in the tape for operating the relays selected in accordance with the tape information, means for moving the tape to successively present the stored information to the operating means, a distribution circuit connected between the operating means and the groups of relays for separately connecting the operating means to the respective groups of relays, and means responsive to the operation of the selected relays in the groups for successively controlling the distribution network to successively and separately connect the operating means to the respective groups of relays.

5. A device for assisting a wireman in connecting a surface wire between a pair of terminals by indicating the selection of the pair of terminals in a group of terminals arranged in perpendicularly disposed rows and columns and by indicating the completion of the wiring between the selected pair of terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that each terminal to be selected is aligned with one of the selected indicators of the row of indicators and one of the selected indicators of either the first or second column of indicators, means for selecting indicators to indicate selection of a pair of the terminals, means for indicating the completion of the surface wire connection between the selected pair of terminals, switching means having a switching element connected in a circuit with and for operating selectively the wire-connection indicating means, the switching means having a control element for controlling the operation of the switching element, an active component having a voltage-biased element connected in a circuit which includes the selected terminals to be interconnected by the surface wire, the active component having current-conducting elements connected in the circuit with the control element of the switching means, and means responsive to the connecting of the surface wire between the selected terminals for applying a voltage to the voltage-biased element of the active element to control the control element of the switching means so that the switching element is selectively operated to operate the wire-connection indicating means.

6. A device for assisting a wireman in connecting a surface wire between a pair of terminals by indicating the selection of the pair of terminals in a group of terminals arranged in perpendicularly disposed rows and columns and by indicating the completion of the wiring between the selected pair of terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that each terminal to be selected is aligned with one of the selected indicators of the row of indicators and one of the selected indicators of either the first or second column of indicators, means for selecting indicators to indicate selection of the pair of the terminals, a first indicating means for indicating the absence of a surface wire between the selected pair of terminals, a second indicating means for indicating the presence of a surface wire between the selected pair of terminals, a first switching means having a first switching element connected in a circuit with and for operating selectively the first indicator and a second switching element connected in a circuit with and for operating selectively the second indicator, the first switching means having a control element for controlling the operation of the first and second switching elements, an active component having a voltage-biased element, the active component having current-conducting elements connected in the circuit with the control element of the first switching means, and a plurality of circuit paths connectable between the terminals of the group and the voltage-biased element of the active component, a second switching means having switching elements connected in the plurality of circuit paths, the second switching means controlled by the terminal-indicator selecting means to establish a circuit path between the selected pair of terminals and the voltage-biased element of the active component, and means responsive to the connecting of the surface wire between the selected terminals for applying a voltage to the voltage-biased element of the active element to control the control element of the first switching means so that the switching elements associated with the first switching means are selectively operated to control the operation of the first and second indicators.

7. A device for assisting a wireman in connecting a surface wire between a pair of terminals by indicating the selection of the pair of terminals in a group of terminals arranged in perpendicularly disposed rows and columns and by indicating the completion of the wiring between the selected pair of terminals, which comprises:

a row of indicators positioned adjacent the group of terminals so that each column of terminals is aligned with one of the indicators, a first column of indicators positioned adjacent one side of the group of terminals so that each row of terminals is aligned with one of the indicators of the first column of indicators, a second column of indicators positioned adjacent the opposite side of the group of terminals so that each row of terminals is aligned with one of the indicators of the second column of indicators, each of the terminals being associated with one of the indicators of the row of indicators and one of the indicators of each of the columns of indicators so that each terminal to be selected is aligned with one of the selected indicators of the row of indicators and one of the selected indicators of either the first or second column of indicators, a plurality of circuit paths connected to the indicators, a plurality of relays having contacts connected in the circuit paths, means for operating selected relays for completing circuit paths to indicators which include a first and second indicator in the row of indicators and one indicator in each column of indicators to indicate the selection of the pair of terminals to the surface wire, means for indicating the presence of a surface wire between the selected pair of terminals, switching means having a switching element connected in a circuit with and for operating selectively the wire-connection indicating means, the switching means having a control element for controlling the operation of the switching element, an active component having a voltage-biased element connected in a circuit which includes the selected terminals to be interconnected by the surface wire, the active component having current-conducting elements connected in the circuit with the control element of the switching means, and means responsive to the connecting of the surface wire between the selected terminals for applying a voltage to the voltage-biased element of the active element to control the control element of the switching means so that the switching element is selectively operated to operate the wire-connection indicating means.

8. A device for assisting a wireman in connecting a surface wire between a pair of terminals by indicating the selection of the pair of terminals in a group of terminals arranged in perpendicularly disposed rows and columns and by indicating the selection of a length of the wire to be connected between the selected terminals and for indicating the completion of connecting the selected wire between the selected pair of terminals, which comprises:

a row of indicators having an indicator aligned with each column of the terminals, a pair of columns of indicators on opposite sides of the group of terminals having indicators aligned at opposite ends of the row of terminals, means for selecting at least two indicators in the row of indicators and one indicator in each of the columns of indicators where each of the indicators in the row are paired respectively with one of the indicators in the columns to indicate the selection of the pair of terminals aligned therewith, means for indicating the length of wire to be connected between the selected terminals, means for sequentially operating the indicator selecting means and the wire length indicating means, means for indicating the completion of the connecting of the selected wire between the selected pair of terminals, switching means having a switching element connected in a circuit with and for operating selectively the wire-connection indicating means, the switching means having a control element for controlling the operation of the switching element, an active component having a voltage-biased element connected in a circuit which includes the selected terminals to be interconnected by the surface wire, the active component having current-conducting elements connected in the circuit with the control element of the switching means, and means responsive to the connecting of the surface wire between the selected terminals for applying a voltage to the voltage-biased element of the active element to control the control element of the switching means so that the switching element is selectively operated to operate the wire-connection indicating means.

9. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals and for indicating the completion of connecting the selected wire between the selected pair of terminals, which comprises:

a row of indicators having an indicator aligned with each column of the terminals, a pair of columns of indicators on opposite sides of the group of terminals having indicators aligned at opposite ends of the row of terminals, means for selecting at least two indicators in the row of indicators and one indicator in each of the columns of indicators where each of the indicators in the row are paired respectively with one of the indicators in the columns to indicate the selection of the pair of terminals aligned therewith, means for indicating the length of wire to be connected between the selected terminals, means for sequentially operating the indicator selecting means and the wire length indicating means, means for indicating the connecting of the selected wire between the selected pair of terminals, means responsive to the selection of a first of the pair of the selected terminals for connecting the first selected terminal to the wire-connection indicating means, means responsive to the selection of a second of the pair of selected terminals for connecting the second selected terminal to the wire connection indicating means, switching means having a switching element connected in a circuit with and for operating selectively the wire-connection indicating means, the switching means having a control element for controlling the operation of the switching element, the wire-connection indicating means being included with an active component having a voltage-biased element connected by the first and second connecting means into the circuit which includes the selected terminals to be interconnected by the surface wire, the active component having current-conducting elements connected in the circuit with the control element of the switching means, and means responsive to the connecting of the surface wire between the selected terminals for applying a voltage to the voltage-biased element of the active element to control the control element of the switching means so that the switching element is selectively operated to operate the wire-connection indicating means.

10. A device for assisting a wireman in connecting a surface wire between a pair of terminals by indicating the selection of the pair of terminals in a group of terminals arranged in perpendicularly disposed rows and columns and by indicating the selection of a length of wire to be connected between the selected terminals and for indicating the completion of connecting the selected wire between the selected pair of terminals, which comprises:

a row of indicators having an indicator aligned with each column of the terminals, a pair of columns of indicators on opposite sides of the group of terminals having indicators aligned at opposite ends of the row of terminals, means for selecting at least two indicators in the row of indicators and one indicator in each of the columns of indicators where each of the indicators in the row are paired respectively with one of the indicators in the columns to indicate the selection of the pair of terminals aligned therewith, a wire supply formed with receptacles for receiving different lengths of wire therein with each receptacle containing wires of a common length, a wire-length indicator positioned adjacent each receptacle, means for selecting one of the wire-length indicators to indicate the length of wire to be selected for connecting between the selected pair of terminals, means for sequentially operating the terminal-indicator selecting means and the wire-length selecting means so that the selected pair of terminals are indicated and the selected length of wire to be connected between the terminals is indicated, means for indicating the connecting of the selected wire between the selected pair of terminals, means responsive to the operation of the terminal-indicator selecting means for conditioning the wire-connecting indicating means for operation when the selected wire is connected between the selected pair of terminals, and means responsive to the connecting of the selected wire between the selected pair of terminals for operating the wire-connecting indicating means.

References Cited

UNITED STATES PATENTS

| | | | |
|---|---|---|---|
| 2,328,750 | 9/1943 | Smith | 324—73 |
| 3,052,842 | 9/1962 | Frohman | 324—66 |
| 3,250,992 | 5/1966 | Cronkite | 324—66 |

RUDOLPH V. ROLINEC, *Primary Examiner.*

E. L. STOLARUN, *Assistant Examiner.*

U.S. Cl. X.R.

29—203, 407, 624, 628; 324—51, 73